(12) United States Patent
Jung et al.

(10) Patent No.: US 12,182,345 B2
(45) Date of Patent: Dec. 31, 2024

(54) ELECTRONIC DEVICE AND METHOD OF CONTROLLING ELECTRONIC DEVICE

(71) Applicant: Samsung Electronics Co., Ltd., Suwon-si (KR)

(72) Inventors: Inhyung Jung, Suwon-si (KR); Sangheon Kim, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/971,127

(22) Filed: Oct. 21, 2022

(65) Prior Publication Data
US 2023/0040753 A1 Feb. 9, 2023

Related U.S. Application Data

(63) Continuation of application No. PCT/KR2022/003043, filed on Mar. 3, 2022.

(30) Foreign Application Priority Data

Mar. 17, 2021 (KR) .................. 10-2021-0034601

(51) Int. Cl.
G06F 3/038 (2013.01)
G06F 3/0354 (2013.01)
(Continued)

(52) U.S. Cl.
CPC .......... *G06F 3/038* (2013.01); *G06F 3/03545* (2013.01); *G06F 3/04842* (2013.01); *G06F 3/0487* (2013.01)

(58) Field of Classification Search
CPC .. G06F 3/038; G06F 3/03545; G06F 3/04842; G06F 3/0487
(Continued)

(56) References Cited

U.S. PATENT DOCUMENTS

| 5,397,865 A | 3/1995 | Park |
| 8,718,938 B2 | 5/2014 | Wolf et al. |

(Continued)

FOREIGN PATENT DOCUMENTS

| JP | 2001-202174 A | 7/2001 |
| KR | 10-0764526 B1 | 10/2007 |

(Continued)

*Primary Examiner* — Mark Edwards
(74) *Attorney, Agent, or Firm* — Jefferson IP Law, LLP

(57) ABSTRACT

An electronic device is provided. The electronic device includes a display, a communicator wirelessly connected to a stylus pen, a processor, and a memory storing instructions that cause the processor to acquire motion information of the stylus pen, in response to the motion information matching with a plurality of motion commands, output a plurality of command images corresponding to the plurality of motion commands, respectively, based on a user feedback command to select one of the plurality of command images, determine the motion information as a motion command corresponding to the selected command image, output a tutorial image, acquire motion information of the stylus pen corresponding to the tutorial image, and determine the motion information of the stylus pen as a motion command corresponding to the tutorial image.

21 Claims, 24 Drawing Sheets

(51) Int. Cl.
    *G06F 3/04842* (2022.01)
    *G06F 3/0487* (2013.01)
(58) Field of Classification Search
    USPC .......................................... 345/179
    See application file for complete search history.

(56) References Cited

U.S. PATENT DOCUMENTS

| | | |
|---|---|---|
| 11,112,889 B2 | 9/2021 | Lee |
| 11,537,230 B2 | 12/2022 | Kwon et al. |
| 2005/0275638 A1 | 12/2005 | Kolmykov-Zotov et al. |
| 2009/0174667 A1* | 7/2009 | Kocienda ............ G06F 3/04895 |
| | | 345/169 |
| 2014/0157179 A1* | 6/2014 | Yuen .................... G06F 3/0237 |
| | | 715/773 |
| 2014/0325435 A1* | 10/2014 | Jung ................... G06F 3/04845 |
| | | 715/790 |
| 2015/0205398 A1* | 7/2015 | Le ........................... G06F 3/017 |
| | | 345/173 |
| 2018/0144189 A1* | 5/2018 | Tran ....................... G06F 3/0488 |
| 2020/0175889 A1* | 6/2020 | Delson ...................... G09B 5/02 |
| 2020/0295847 A1* | 9/2020 | Levionnais .............. H04B 5/77 |

FOREIGN PATENT DOCUMENTS

| | | |
|---|---|---|
| KR | 10-2020-0095739 A | 8/2020 |
| KR | 10-2021-0014401 A | 2/2021 |

* cited by examiner

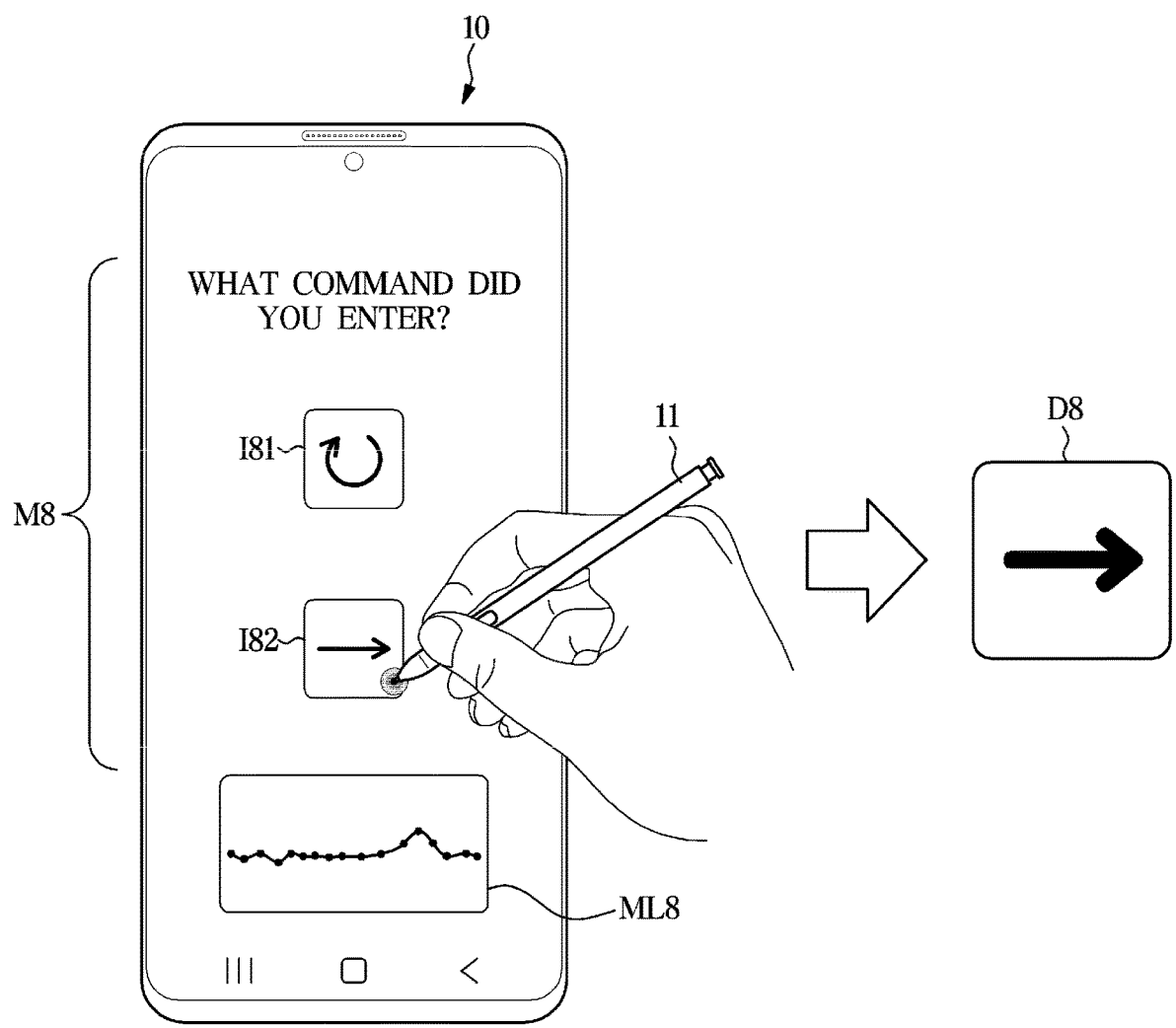

ELECTRONIC DEVICE AND METHOD OF CONTROLLING ELECTRONIC DEVICE

CROSS-REFERENCE TO RELATED APPLICATION(S)

This application is a continuation application, claiming priority under § 365(c), of an International application No PCT/KR2022/003043, filed on Mar. 3, 2022, which is based on and claims the benefit of a Korean patent application number 10-2021-0034601, filed on Mar. 17, 2021, in the Korean Intellectual Property Office, the disclosure of which is incorporated by reference herein in its entirety.

BACKGROUND

1. Field

The disclosure relates to an electronic device including a stylus pen. More particularly, the disclosure relates to and electronic device including a stylus pen, a user terminal, and a method of controlling the electronic device.

2. Description of Related Art

A user terminal (e.g., a mobile device) may be a portable device capable of being portable and having at least one function capable of performing voice call and video call, a function of inputting or outputting information, or a function of storing data.

As the functions of the user terminals are diversified, the user terminals are equipped with complex functions, such as taking photos or videos, playing music files or moving pictures, playing games, receiving broadcasts, wireless Internet, and the like.

In addition, for the sake of user convenience, the user terminals are implemented also in a form that the operation of the user terminal is controlled using a stylus pen, such as a stylus pen.

The user terminal may perform an operation based on the motion of the stylus pen, but have a limitation in that the user terminal does not smoothly recognize the motion of the stylus pen for each user.

Such a limitation may occur as a characteristic that occurs in an unconscious behavior that is not recognized even by the user.

On the other hand, since the types of unconscious behaviors are all different between users, it is difficult for the user terminal to recognize the motions for each type of unconscious behavior in practice.

Therefore, in order to solve the above-described limitation, research is being actively conducted to increase the recognition rate of the motion of the user.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and a method of controlling the same that are capable of more accurately recognizing the motion of a stylus pen using user feedback, thereby increasing the user convenience.

Additional aspects will be set forth in part in the description which follows and, in part, will be apparent from the description, or may be learned by practice of the presented embodiments.

In accordance with an aspect of the disclosure, an electronic device is provided. The electronic device includes a display, a communication module configured to be wirelessly connected to a stylus pen, a processor operatively connected to the display and the communication module, and a memory operatively coupled to the processor, wherein the memory stores instructions that cause the processor to acquire motion information of the stylus pen, in response to the motion information matching with a plurality of motion commands, output a plurality of command images corresponding to the plurality of motion commands, respectively, to the display, and based on a user feedback command to select one of the plurality of command images, determine the motion information as a motion command corresponding to the selected command image.

The instructions may cause the processor to output a tutorial image to the display, acquire motion information of the stylus pen corresponding to the tutorial image, and determine the motion information of the stylus pen as a motion command corresponding to the tutorial image.

The instructions may cause the processor to after acquiring the motion information of the stylus pen corresponding to the tutorial image, output a feedback message to the display, and determine the motion information of the stylus pen as the motion command corresponding to the tutorial image based on a user input corresponding to the feedback message.

The instructions may cause the processor to determine a matching score of each of the plurality of motion commands based on a degree of similarity between the motion information and each of the plurality of motion commands, and output, to the display, a plurality of command images corresponding to the plurality of motion commands in which the matching score exceeds a predetermined value.

The instructions may cause the processor to compare a degree of similarity between a motion part of the motion information exceeding a predetermined ratio and each of the plurality of motion commands, and match the motion information with at least one of the plurality of commands.

The instructions may cause the processor to perform supervised learning using the plurality of motion commands as reference data and using the motion information as input data, to match the motion information with the plurality of motion commands.

The instructions may cause the processor to, based on an application executed in the user terminal, assign a first weight to each of the plurality of motion commands, and match the motion information with at least one of the plurality of motion commands based on the motion information and the first weight.

The instructions may cause the processor to form matching data in which each of the plurality of motion commands corresponds to the motion information for each user account registered on the user terminal, and execute one of the plurality of commands based on the matching data and the motion information.

The instructions may cause the processor to assign a second weight to a part of the motion information based on the matching data, and recognize the motion information assigned the second weight as one of the motion commands.

In accordance with another aspect of the disclosure, a method of controlling an electronic device is provided. The method includes acquiring motion information of a stylus pen, in response to the motion information being matching with a plurality of motion commands, outputting a plurality of command images corresponding to the plurality of motion commands, respectively, to a display, and based on a user feedback command to select one of the plurality of command images, determining the motion information as a motion command corresponding to the selected command image.

The determining of the motion information as the motion command corresponding to the selected command image may include outputting a tutorial image to the display, acquiring motion information of the stylus pen corresponding to the tutorial image, and determining the motion information of the stylus pen as a motion command corresponding to the tutorial image.

The determining of the motion information as the motion command corresponding to the selected command image may include after acquiring the motion information of the stylus pen corresponding to the tutorial image, outputting a feedback message to the display, and determining the motion information of the stylus pen as the motion command corresponding to the tutorial image based on a user input corresponding to the feedback message.

The outputting of the plurality of command images to the display may include determining a matching score of each of the plurality of motion commands based on a degree of similarity between the motion information and each of the plurality of motion commands, and outputting, to the display, a plurality of command images corresponding to the plurality of motion commands in which the matching score exceeds a predetermined value.

The determining of the motion information as the motion command corresponding to the selected command image may include comparing a degree of similarity between a motion part of the motion information exceeding a predetermined ratio and each of the plurality of motion commands, and matching the motion information with at least one of the plurality of commands.

The determining of the motion information as the motion command corresponding to the selected command image may include performing supervised learning using the plurality of motion commands as reference data and using the motion information as input data, to match the motion information with the plurality of motion commands.

The determining of the motion information as the motion command corresponding to the selected command image may include based on an application executed in the user terminal, assigning a first weight to each of the plurality of motion commands, and matching the motion information with at least one of the plurality of motion commands based on the motion information and the first weight.

The method of controlling the electronic device according to an embodiment may further include forming matching data in which each of the plurality of motion commands corresponds to the motion information for each user account registered on the user terminal, and executing one of the plurality of commands based on the matching data and the motion information.

The executing of one of the plurality of commands based on the matching data and the motion information may include assigning a second weight to a part of the motion information based on the matching data, and recognizing the motion information assigned the second weight as one of the motion commands.

In accordance with another aspect of the disclosure, an electronic device is provided. The electronic device includes stylus pen, and a user terminal configured to perform a communication with the stylus pen, wherein the user terminal is configured to acquire motion information of the stylus pen, in response to the motion information being matching with a plurality of motion commands, output a plurality of command images corresponding to the plurality of motion commands, respectively, to the display, and based on a user feedback command to select one of the plurality of command images, determine the motion information as a motion command corresponding to the selected command image.

The user terminal may be configured to output a tutorial image to the display, acquire motion information of the stylus pen corresponding to the tutorial image, and determine the motion information of the stylus pen as a motion command corresponding to the tutorial image.

The electronic device and the method of controlling the same according to an embodiment can more accurately recognize a motion of a stylus pen using user feedback, thereby increasing user convenience.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 8A and 8B are diagrams for describing an operation of matching motion information with a motion command based on user feedback according to various embodiments of the disclosure;

Throughout the drawings, it should be noted that like reference numbers are used to depict the same or similar elements, features, and structures.

DETAILED DESCRIPTION

Figure 1A:
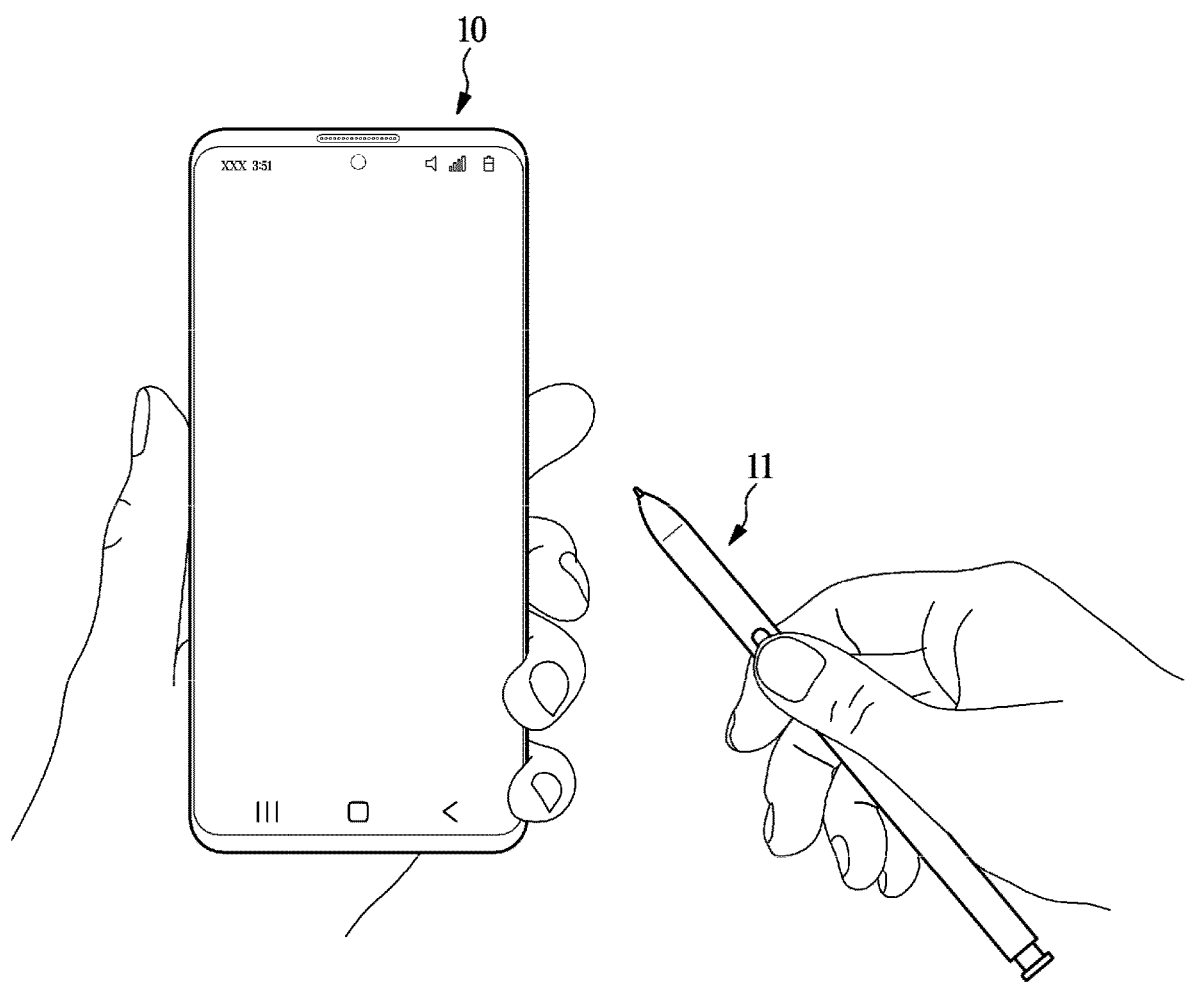
FIGS. 1A and 1B are views illustrating an operating state of a stylus pen and a user terminal according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, and/or components.

In the specification, it will be understood that, when a member is referred to as being "on/under" another member, it may be directly on/under the other member, or one or more intervening members may in addition be.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method operations are just used for convenience of explanation, but not to limit an order of the operations. Thus, unless the context clearly dictates otherwise, the written order may be practiced otherwise.

Hereinafter, the principles and embodiments of the disclosure will be described with reference to the accompanying drawings.

FIG. 1A is a diagram illustrating an operation state of a stylus pen and a user terminal according to an embodiment of the disclosure.

Figure 2:
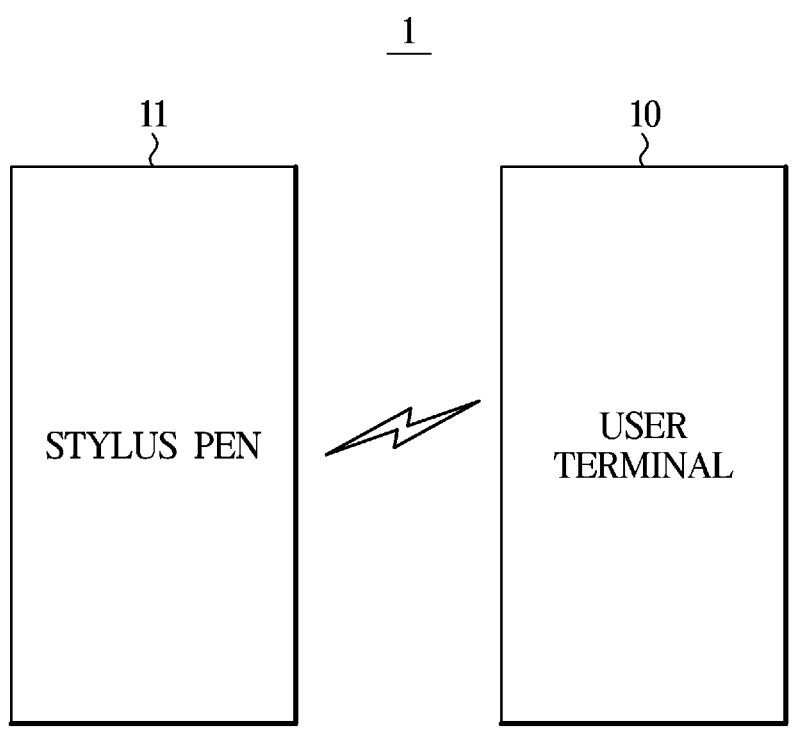
FIG. 2 is a control block diagram illustrating a stylus pen and a user terminal according to an embodiment of the disclosure.

FIG. 2 is a control block diagram of a stylus pen and a user terminal according to an embodiment of the disclosure.

Meanwhile, in the specification, an electronic device 1 may refer to a device including a stylus pen 11 and a user terminal 10.

In the specification, the stylus pen 11 may be provided as a pen-shaped tool used to control the user terminal 10.

Referring to FIGS. 1A and 2, a user may control the user terminal 10 through an operation of directly tapping or dragging on a display of the user terminal 10 using the stylus pen 11 or an operation of clicking a button on the stylus pen 11.

The user terminal 10 may be implemented as various electronic devices including a touch screen, such as a mobile phone, a smart phone, a tablet personal computer (PC), a personal digital assistant (PDA), a portable multimedia player (PMP), a digital camera, etc. However, the disclosure is not limited thereto.

The stylus pen 11 may include a clickable button. The user may control the user terminal 10 by clicking the button on the stylus pen 11 in various ways. The method of clicking the button may include a method of clicking the button once, a method of double clicking the button, a method of long clicking the button, and the like but may not be limited thereto.

The stylus pen 11 may receive an input of clicking the button.

The stylus pen 11 may transmit a control signal corresponding to the received input to the user terminal 10.

The stylus pen 11 may transmit the control signal to the user terminal 10 using a communication channel formed between the stylus pen 11 and the user terminal 10.

In addition, the stylus pen 11 may include a motion sensor capable of detecting a motion of a user. Here, the motion sensor may include at least one of a geomagnetic sensor, a position sensor, an acceleration sensor, a gyroscope sensor, and a proximity sensor, but the disclosure is not limited thereto.

When the stylus pen 11 includes a motion sensor, a user may present a predetermined motion using the stylus pen 11.

Figure 1B:
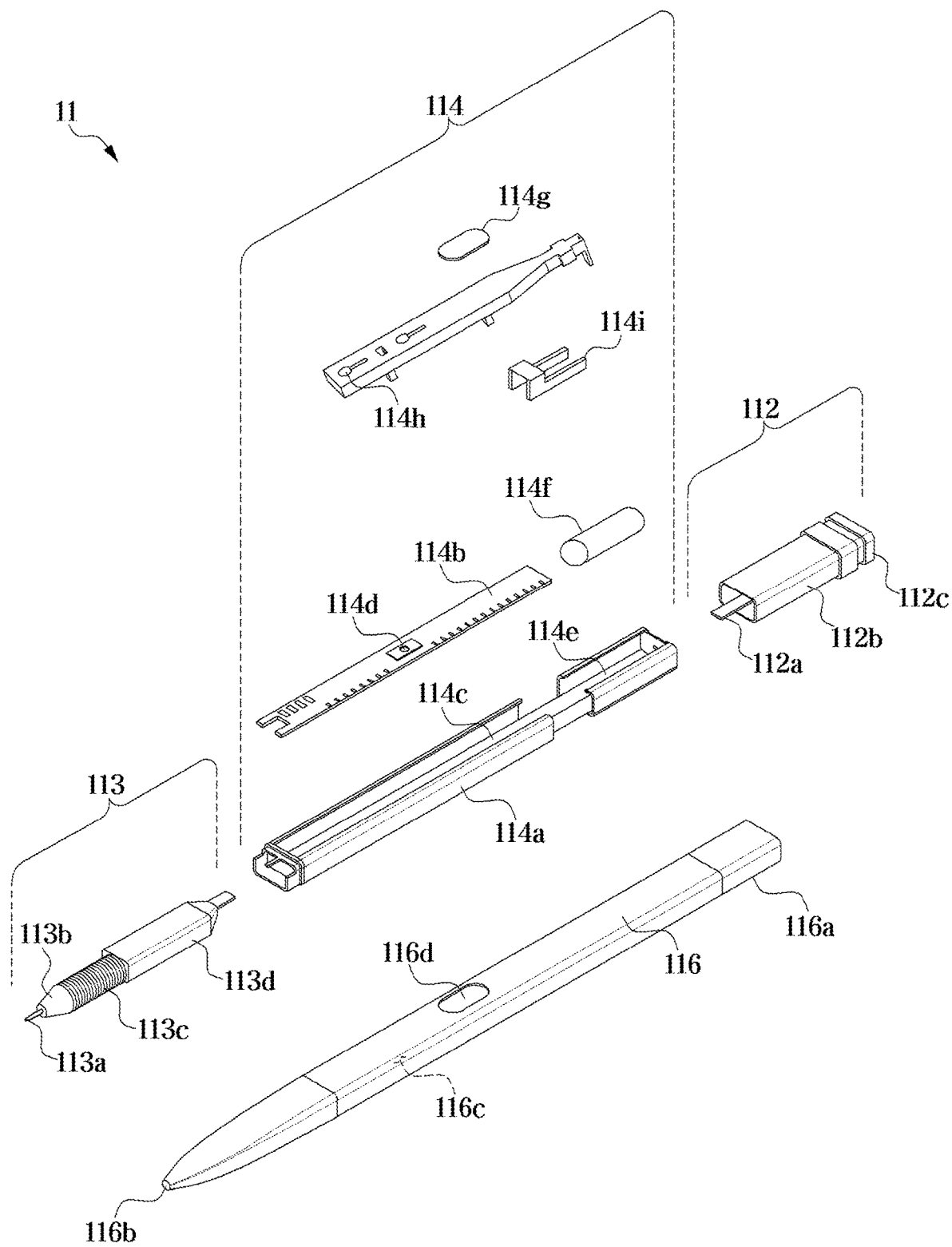

FIG. 1B is an exploded perspective view illustrating a stylus pen according to an embodiment of the disclosure.

Referring to FIG. 1B, according to various embodiments, a stylus pen 11 may include a pen housing 116 constituting an outer appearance of the stylus pen 11 and an inner assembly inside the pen housing 116. In the illustrated embodiment, the inner assembly may include all of various components mounted inside the pen and may be inserted into the pen housing 116 in one assembly operation.

The pen housing 116 may have an elongated shape between a first end 116a and a second end 116b, and may include an accommodation space 116c therein. The pen housing 116 may have an elliptical cross-section including a major axis and a minor axis, and may be formed in an elliptical column shape as a whole. The accommodation space 116c of the electronic device 101 may also have an elliptical cross-section to correspond to the shape of the pen housing 116. The pen housing 116 may include a synthetic resin (e, g., plastic) and/or a metallic material (e.g., aluminum). According to an embodiment, the second end 116b of the pen housing 116 may be formed of a synthetic resin material.

The inner assembly may have an elongated shape to correspond to the shape of the pen housing 116. The inner assembly may be largely divided into three parts along the longitudinal direction. For example, the inner assembly may include an ejection member 112 disposed at a position corresponding to the first end 116a of the pen housing 116, a coil part 113 disposed at a position corresponding to the second end 116b of the pen housing 116, and a circuit board part 114 disposed at a position corresponding to the body of the housing.

The ejection member 112 may include a component for withdrawing the stylus pen 11 from the accommodation space 116c of the electronic device 101. According to one embodiment, the ejection member 112 may include a shaft 112a, an ejection body 112b disposed around the shaft 112a and constituting the overall appearance of the ejection member 112, and a button part 112c. When the inner assembly is fully inserted into the pen housing 116, a portion including the shaft 112a and the ejection body 112b may be surrounded by the first end 116a of the pen housing 116, and the button part 112c (e.g., 201a in FIG. 2) may be exposed to the outside of the first end 116a. A plurality of components not shown, for example, cam members or elastic members, may be disposed within the ejection body 112b to form a push-pull structure. In one embodiment, the button part 112c may be substantially coupled to the shaft 112a to make a linear reciprocating motion with respect to the ejection body 112b. According to various embodiments, the button part 112c may include a button having a locking structure such that a user may take out the stylus pen 11 using a fingernail. According to an embodiment, the stylus pen 11 may provide another input method by including a sensor for detecting a linear reciprocating motion of the shaft 112a.

The coil part 113 may include a pen tip 113a exposed to the outside of the second end 116b when the inner assembly is fully inserted into the pen housing 116, a packing ring 113b, a coil wound a plurality of times and/or a pen pressure sensing part 113d for acquiring a change in pressure according to the pressing of the pen tip 113a. The packing ring 113b may include epoxy, rubber, urethane, or silicone. The packing ring 113b may be provided for the user of waterproofing and dustproofing, and may protect the coil part 113 and the circuit board part 114 from water immersion or dust. According to an embodiment, a coil 113c may form a resonant frequency in a set frequency band (e.g., 500 kHz), and may be combined with at least one element (e.g., a capacitive element) to adjust a resonance frequency formed by the coil 113c in a certain extent of range.

The circuit board part 114 may include a printed circuit board 114b, a base 114a surrounding at least one surface of the printed circuit board 114b, and an antenna. According to an embodiment, the base 114a may be provided on an upper surface thereof with a substrate seating part 114c on which the printed circuit board 114b is disposed, and the printed circuit board 114b seated on the substrate seating part 114c may be fixed. According to an embodiment, the printed circuit board 114b may include an upper surface and a lower surface, and a variable capacitance capacitor or switch 114d connected to the coil 113c may be disposed on the upper surface, and a charging circuit, a battery, or a communication circuit may be disposed on the lower surface. The battery may include an electric double layered capacitor (EDLC). The charging circuit may be positioned between the coil 113c and the battery, and may include a voltage detector circuitry and a rectifier.

The antenna may include an antenna structure 114i as shown in FIG. 1B and/or an antenna embedded in the printed circuit board 114b. According to various embodiments, the switch 114d may be provided on the printed circuit board 114b. A side button 114g provided on the stylus pen 11 may be used to press the switch 114d and may be exposed to the outside through a side opening 116d of the pen housing 116. The side button 114g is supported by a support member 114h, and unless an external force applied to the side button 114g, the side button 114g may be restored or maintained at a predetermined position with an elastic restoring force provided by the support member 114h.

The circuit board part 114 may include other packing rings, such as O-rings. For example, O-rings formed of an elastic material may be disposed at both ends of the base 114a to form a sealing structure between the base 114a and the pen housing 116. In some embodiments, the support member 114h may partially come in close contact with an inner wall of the pen housing 116 around the side opening 116d to form a sealing structure. For example, the circuit board part 114 may also have a waterproof and dustproof structure similar to the packing ring 113b of the coil part 113.

The stylus pen 11 may include a battery seating part 114e on an upper surface of the base 114a formed to seat a battery 114f thereon. The battery 114f that may be mounted on the battery seating part 114e may include, for example, a cylinder type battery.

The stylus pen 11 may include a microphone (not shown). The microphone may be directly connected to the printed circuit board 114b or connected to a separate flexible printed circuit board (FPCB) (not shown) connected to the printed circuit board 114b. According to various embodiments, the microphone may be disposed in a position parallel to the side button 114g in the longitudinal direction of the stylus pen 11.

A motion sensor in the stylus pen 11 may detect a motion of a user, and the user terminal 10 may be controlled based on a signal corresponding to the detected motion of the user.

For example, when a camera application is running in the user terminal 10, a zoom-in operation in the camera application may be performed based on a motion of a user drawing a circle using the stylus pen 11.

Here, the stylus pen 11 may transmit a control signal to the user terminal 10 using short-range communication including Bluetooth, infrared, and the like.

In addition, the user terminal 10 may, in response to receiving a user input, such as tapping or dragging on the touch screen, generate a control signal corresponding to the received user input.

According to an embodiment, the stylus pen 11 may include a battery. When the stylus pen 11 is inserted into a slot of the user terminal 10, the battery of the stylus pen 11 is connected to a power supply circuit inside the user terminal 10, so that the battery of the stylus pen 11 may be charged. Meanwhile, according to another embodiment, the stylus pen 11 may be charged through wireless charging with the user terminal 10, even without being inserted into the slot.

Meanwhile, the operation described with reference to FIGS. 1A and 1B is merely an embodiment of an operation between the user terminal 10 and the stylus pen 11 included in the electronic device 1, and the operation of the stylus pen 11 and the user terminal 10 is not limited thereto.

Figure 3:
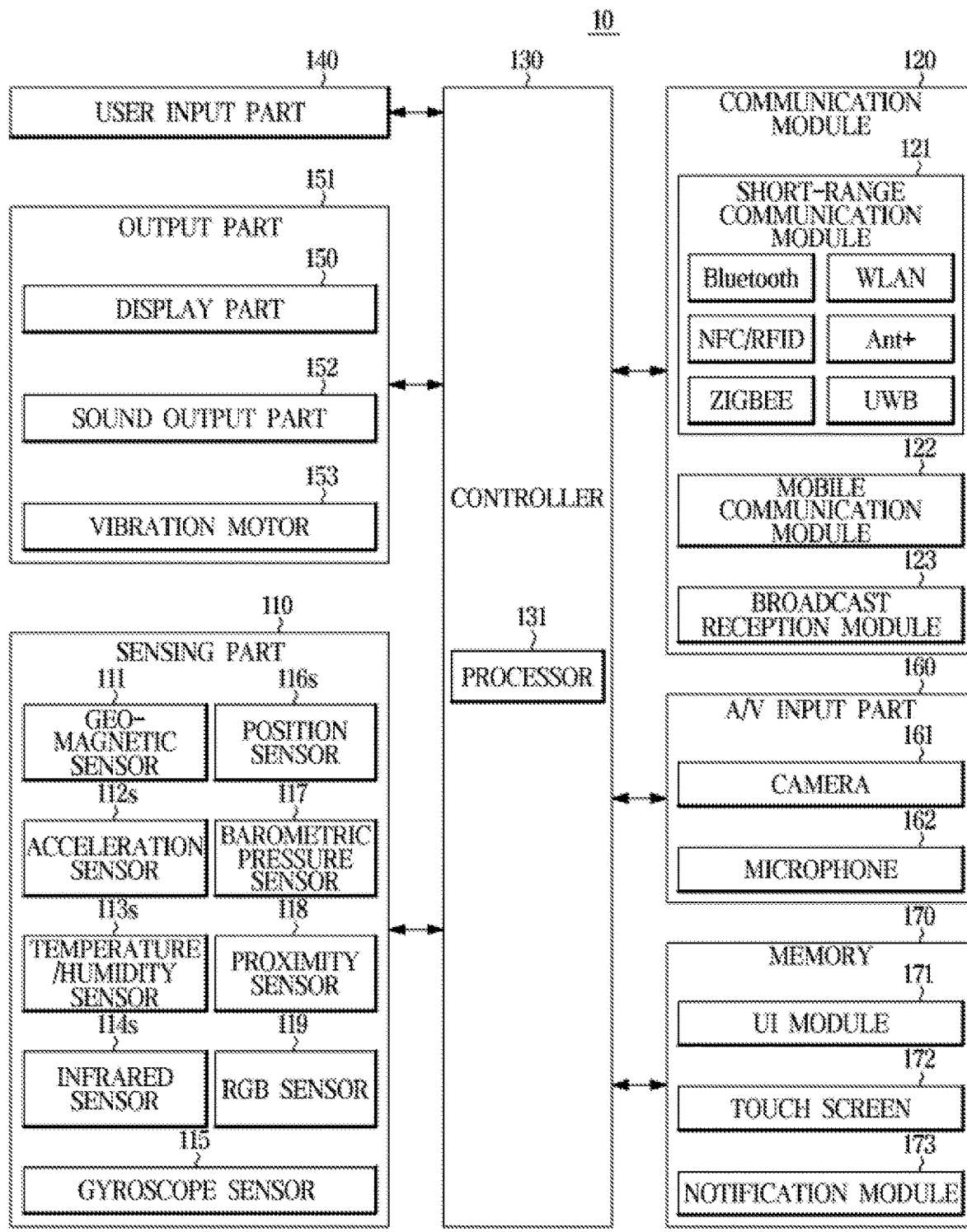
FIG. 3 is a control block diagram illustrating a user terminal according to an embodiment of the disclosure.

FIG. 3 is a control block diagram illustrating a user terminal according to an embodiment of the disclosure.

Referring to FIG. 3, a user terminal 10 according to the disclosed embodiment may further include an audio/video (A/V) input part 160 and a memory 170 as well as a sensing part 110, a communication module 120, a control part or controller 130, a user input part 140, and a display part 150.

The sensing part 110 may detect a state of the user terminal 10 or a state around the user terminal 10, and transmit the detected information to the control part 130.

The sensing part 110 may include a motion sensor.

Specifically, the sensing part 110 may include at least one of a geomagnetic sensor (a magnetic sensor) 111, an acceleration sensor 112s, a temperature/humidity sensor 113s, an infrared sensor 114s, a gyroscope sensor 115, a position sensor (e.g., a global positioning system (GPS)) 116s, a barometric pressure sensor 117, a proximity sensor 118, or red, green, blue (RGB) sensor (an illuminance sensor) 119, but the disclosure is not limited thereto. Since the function of each sensor may be intuitively inferred from the name thereof by a person skilled in the art, detailed descriptions thereof will be omitted.

The sensing part 110 may sense a motion of the user terminal 10, a biometric signal of the user of the user terminal 10, a touch signal input to the user terminal 10, and the like.

The communication module 120 may include one or more components for performing communication between the user terminal 10 and the stylus pen 11 or communication with an external device. For example, the communication module 120 may include a short-range wireless communication module 121, a mobile communication module 122, and a broadcast reception module 123.

The short-range wireless communication module 121 may include a Bluetooth communication module, a near field communication module, a wireless local area network (WLAN) (e.g., wireless fidelity (Wi-Fi)) communication module, a Zigbee communication module, an infrared (infrared Data Association (IrDA)) communication module, a Wi-Fi Direct (WFD) communication module, an ultra-wideband (UWB) communication module, an Ant+ communication module, and the like, but the disclosure is not limited thereto.

The mobile communication module 122 transmits and receives wireless signals to and from at least one of a base station, an external terminal, or a server on a mobile communication network. Here, the wireless signal may include various types of data according to transmission and reception of a voice call signal, a video call signal, or a text/multimedia message.

The broadcast reception module 123 receives a broadcast signal and/or broadcast-related information from the outside through a broadcast channel. The broadcast channel may include a satellite channel and a terrestrial channel. Depending on the embodiment, the mobile terminal 100b may not include the broadcast reception module 123.

Meanwhile, the communication module 120 may receive motion information of the stylus pen 11 from the stylus pen 11 including a motion sensor.

In addition, the communication module 120 may be provided to receive a direction signal from an anchor device 3 that includes a direction detection sensor.

An output part 151 is provided to output an audio signal, a video signal, or a vibration signal, and may include the display part 150, a sound output part 152, a vibration motor 153, and the like.

The display part 150 displays and outputs information processed by the user terminal 10.

In addition, when the display part 150 is provided as a touch screen by forming a layer structure with a touch pad, the display part 150 may also serve as a stylus pen as well as an output device.

The display part 150 may include at least one of a liquid crystal display, a thin film transistor-liquid crystal display, an organic light-emitting diode, a flexible display, a three-dimensional (3D) display, or an electrophoretic display.

The sound output part 152 outputs audio data received from the communication module 120 or stored in the memory 170.

In addition, the sound output part 152 outputs a sound signal related to a function (e.g., a call signal reception sound, a message reception sound, and a notification sound) performed by the user terminal 10. The sound output part 152 may include a speaker, a buzzer, and the like.

The vibration motor 153 may output a vibration signal. For example, the vibration motor 153 may output a vibration signal corresponding to the output of audio data or video data (e.g., a call signal reception sound, a message reception sound, etc.). In addition, the vibration motor 153 may output a vibration signal when a touch is input to the touch screen.

The user input part 140 refers to a device used for a user to input data for controlling the user terminal 10. For example, the user input part 140 includes a key pad, a dome switch, and a touch pad (e.g., a contact capacitive method, a pressure resistance film method, an infrared sensing method, a surface ultrasonic conduction method, an integral type tension measurement method, a piezo effect method, etc.), a jog wheel, a jog switch, and the like, but the disclosure is not limited thereto.

The A/V input part 160 is provided to input an audio signal or a video signal, and may include a camera 161, a microphone 162, and the like.

The camera 161 may obtain an image frame of a still image or a moving image through an image sensor in a video call mode or a shooting mode. The image captured through the image sensor may be processed through the control part 130 or a separate image processing part (not shown).

The image frame processed by the camera 161 may be stored in the memory 170 or transmitted to the outside through the communication module 120. The camera 161 may be provided as two or more cameras 161 according to the configuration of the user terminal 10.

The microphone 162 receives an external sound signal and processes the received sound signal into electrical speech data. For example, the microphone 162 may receive a sound signal from an external device or a speaker. The microphone 162 may use various noise removal algorithms for removing noise generated in the process of receiving an external sound signal.

The memory 170 may store a program for processing and controlling of the control part 130, and may store input/output data (e.g., applications, content, time zone information of an external device, address books, etc.).

The memory 170 may include at least one type of storage medium among a flash memory type memory, a hard disk type memory, a multimedia card micro type memory, a card type memory (e.g., a secure digital (SD) or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. In addition, the user terminal 10 may operate a web storage or a cloud server that performs a storage function of the memory 170 on the Internet.

Meanwhile, a plurality of motion commands may be stored in the memory 170.

The motion command may refer to a command recognized by the user terminal based on a motion.

Programs stored in the memory 170 may be classified into a plurality of modules according to the functions thereof, for example, a user interface (UI) module 171, a touch screen 172, a notification module 173, and the like.

The UI module 171 may provide a specialized UI, a graphical user interface (GUI), etc., that are linked with the user terminal 10 for each application.

The touch screen 172 may detect a user's touch gesture on a touch screen and transmit information about the touch gesture to the control part 130. The touch screen 172 according to the disclosed embodiment may recognize and analyze a touch code. The touch screen 172 may be configured as separate hardware including a controller.

In order to detect a touch or a proximity touch of the touch screen, various sensors may be provided inside or near the touch screen. An example of the sensor for detecting a touch of a touch screen includes a tactile sensor. A tactile sensor refers to a sensor that detects a touch of a specific object at a certain extent of sensitivity felt by a human or greater. The tactile sensor may detect various types of information, such as the roughness of a contact surface, the hardness of a contact object, and the temperature of a contact point.

In addition, an example of the sensor for detecting a touch of a touch screen may include a proximity sensor.

The proximity sensor refers to a sensor that detects the presence or absence of an object approaching a predetermined detection surface or an object existing in the vicinity of a predetermined detecting surface using the force of an electromagnetic field or infrared rays without mechanical contact. Examples of the proximity sensor include a transmission type photoelectric sensor, a direct reflection type photoelectric sensor, a mirror reflection type photoelectric sensor, a high frequency oscillation type proximity sensor, a capacitive type proximity sensor, a magnetic type proximity sensor, an infrared proximity sensor, and the like.

A touch gesture of a user may include a tap, a touch and hold, a double tap, a drag, a panning, a flick, a drag and drop, a swipe, and the like.

The notification module 173 may generate a signal for notifying the occurrence of an event of the user terminal 10. Examples of the events generated in the user terminal 10 include call signal reception, message reception, key signal input, schedule notification, and the like.

The notification module 173 may output a notification signal in the form of a video signal through the display part 150, may output a notification signal in the form of an audio signal through the sound output part 152, and may output a notification signal in the form of a vibration signal through the vibration motor 153.

The control part 130 controls the overall operation of the user terminal 10. For example, the control part 130 executes programs stored in the memory 170 to thereby control the sensing part 110, the communication module 120, the output part 151, the user input part 140, the A/V input part 160, the memory 170, and the like.

The control part includes a memory for storing data regarding an algorithm for controlling the operations of the components of the user terminal 10 or a program that represents the algorithm, and a processor 131 that performs the above described operations using the data stored in the memory. In this case, the memory and the processor may be implemented as separate chips. Alternatively, the memory and the processor may be implemented as a single chip.

Meanwhile, the control part may be configured to include at least one processor 131.

The processor 131 may acquire motion information of the stylus pen and match the motion information with a plurality of motion commands.

The motion information may refer to information obtained by acquiring a motion of the stylus pen.

The motion command may refer to a command for inputting a command to the user terminal based on the motion of the stylus pen.

The processor 131 may output a plurality of command images corresponding to the plurality of motion commands, respectively, to the display.

The command image may refer to an image including the form of a motion command.

The processor 131 may, based on a user feedback command for selecting one of the plurality of command images, determine the motion information as a motion command corresponding to the selected command image.

The processor 131 may output a tutorial image to the display.

The tutorial image may refer to an image output by the user terminal to guide a specific motion of the user in order to acquire motion information of the user.

The processor 131 may acquire motion information of the stylus pen corresponding to the tutorial image, and determine the motion information of the stylus pen as a motion command corresponding to the tutorial image.

That is, the processor 131 may output a tutorial image corresponding to a specific motion command, acquire user motion input subsequent to the output of the tutorial image, and match the user motion with the corresponding motion command.

On the other hand, the processor 131, after acquiring the motion information of the stylus pen corresponding to the tutorial image, may output a feedback message to the display.

The processor may, based on a user input corresponding to the feedback message, determine the motion information of the stylus pen as the motion command corresponding to the tutorial image.

The processor 131 may acquire a user's motion subsequent to output of the tutorial image, and based on a user command that is input in response to a feedback image additionally output after the acquisition of the user's motion, determine whether to match the user's motion with a gesture command.

The processor 131 may determine a matching score of each of the plurality of motion commands based on the degree of similarity of the motion information and each of the plurality of motion commands.

The matching score may refer to a standardized score determined by the degree of similarity between motion information and each of a plurality of predetermined motion commands.

For example, when the degree of similarity between the motion information and the motion command is high, a high matching score may be recorded, and when the degree of similarity between the motion information and the motion command is low, a low matching score may be recorded.

The processor 131 may determine the degree of similarity by comparing the motion form of the motion information with the motion form of the motion command, and may assign a score to each of the corresponding motion commands based on the degree of similarity.

The processor 131 may output, on the display, a plurality of command images corresponding to a plurality of motion commands whose matching scores exceed a predetermined value.

Meanwhile, in determining the degree of similarity, the processor 131 may compare the similarities between a motion part of the motion information exceeding a predetermined ratio and each of the plurality of motion commands.

That is, in comparing the motion information of the user with the motion command, the processor 131 may compare a part of the motion information instead of the entire motion information.

The processor 131 may perform supervised learning using the plurality of motion commands as reference data and using the motion information as input data to match the motion information with the plurality of motion commands.

Supervised learning is a method of machine learning for inferring a function from training data. Training data generally includes attributes of an input object in the form of vectors, and may include desired results for each vector.

On the other hand, training data may refer to input data, and a desired result may refer to reference data.

In the disclosure, the user terminal may learn a large amount of motion data using a plurality of motion commands as reference data to match motion data with a motion command.

The processor 131 assigns a first weight to each of the plurality of motion commands based on an application executed in the user terminal, and based on the motion information and the first weight, match the motion information with at least one of the plurality of motion commands.

The first weight may refer to a weight assigned to a motion command, which increases the probability that motion data is recognized as a specific motion command.

For example, when a specific application is running in the user terminal, the processor 131 may assign a greater weight to a motion command frequently used in the specific application such that the corresponding motion command is determined as a motion command to match with the motion of the user.

The processor 131 may form matching data in which each of the plurality of motion commands matches with motion information for each user account registered on the user terminal.

The matching data may refer to data including a correspondence relationship between a user's motion and a motion command.

Meanwhile, such matching data may be determined for each user account. That is, matching data corresponding to a first user account may be different from matching data corresponding to a second user account.

Accordingly, the processor 131 may execute one of a plurality of commands based on the matching data and the motion information.

The processor 131 may assign a second weight to a part of the motion information based on the matching data.

The second weight may refer to a weight applied to at least a part of the motion data in recognizing the motion data.

That is, the processor 131 may assign a greater weight to a specific part of recognized motion information to thereby match the corresponding motion information with the motion command.

In addition, the processor 131 may configure a software module that performs the above-described operations.

Specifically, the software module may include an application layer, a framework layer, a library layer, a kernel layer, and a hardware layer.

The application may be provided to draw at least one layer based on the resolution of a display area of the display.

The framework layer may include a plurality of programs.

In more detail, a window manager may be configured to, in response to a state change of the electronic device being identified through the sensor module, transmit information about the display area to the application.

In addition, the framework layer may include a stylus personalization manager Stylus Gesture Personalization Manager (SGPM).

The processor may perform the above-described operations through the SGPM.

The library layer, a hardware abstraction layer (HAL) may refer to an abstraction layer between a plurality of hardware modules included in a hardware layer and software of the electronic device.

The kernel layer may include various drivers for controlling various hardware modules included in the electronic device. The kernel driver layer may include a sensor driver including an interface module for controlling a sensor controller connected to a sensor.

At least one component may be added or omitted to correspond to the performances of the components of the user terminal shown in FIG. 3. In addition, the mutual positions of the components may be changed to correspond to the performance or structure of the system.

Meanwhile, some of the components shown in FIG. 3 may refer to a software component and/or a hardware component, such as a field programmable gate array (FPGA) and an application specific integrated circuit (ASIC).

Figure 4:
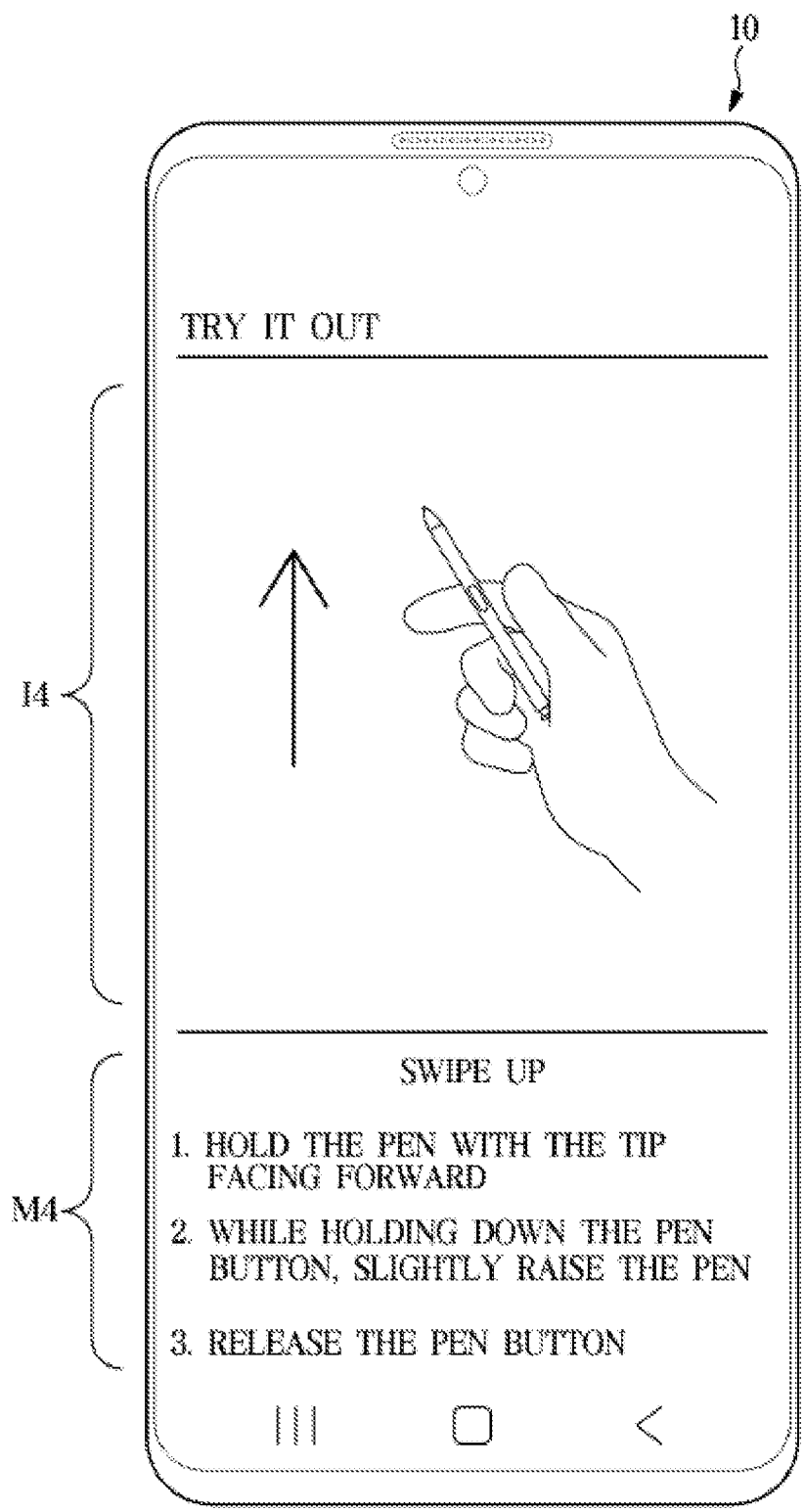
FIG. 4 is a diagram illustrating a tutorial image according to an embodiment of the disclosure.

FIG. 4 is a diagram illustrating a tutorial image according to an embodiment of the disclosure.

Referring to FIG. 4, a user terminal 10 may output a tutorial image I4 on the display.

The user terminal 10 may receive a state of the stylus pen and motion information of the stylus pen.

In FIG. 4, the motion information may refer to user behavior pattern information and usage characteristic information of the user that are recognized after the tutorial image I4 is output.

According to an embodiment, the user terminal 10 may output the tutorial image I4 to the user and receive information about the user's repeated motions through the output of the tutorial image I4.

Specifically, as shown in FIG. 4, the tutorial image I4 showing an upward swipe operation may be output on the display of the user terminal.

The tutorial image may include an image I4 capable of guiding the motion of the stylus pen and a description M4 thereof.

In FIG. 4, the tutorial image I4 inducing the user to move the stylus pen from top to bottom is output.

The user may, after the output of the tutorial image I4 to the user terminal, move the stylus pen upward to transmit the motion information to the user terminal.

That is, the user terminal 10 may acquire the motion information of the stylus pen corresponding to the tutorial image I4, That is, in FIG. 4, the motion information of the stylus pen may be determined as a motion command corresponding to the tutorial image I4.

In FIG. 4, a motion command for swiping from bottom to top is disclosed, and the user terminal 10 may match the user motion with a motion command for swiping from top to bottom.

Meanwhile, the user terminal 10 may, after the output of the tutorial image, receive gesture input information of the user to collect the motion information of the user, and determine whether the inputted motion information is normal.

Meanwhile, when the input motion information is incorrect, the user terminal 10 may induce the user to perform repeated actions several times. Detailed descriptions thereof will be provided below.

In addition, the operation of matching the motion of the user with the motion command will be described in detail with reference to FIG. 5.

Figure 5:
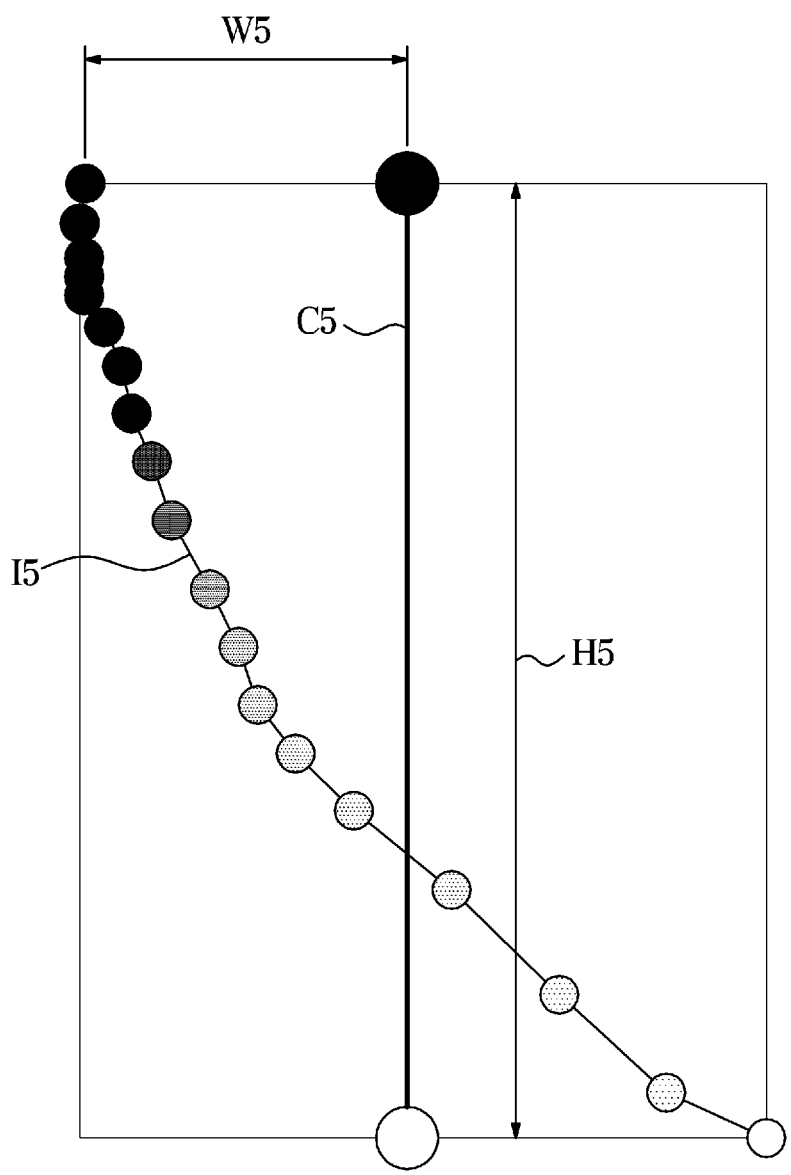
FIG. 5 is a diagram for describing an operation in which a user terminal determines a score of a gesture command based on a degree of similarity between motion information and a pre-stored motion command according to an embodiment of the disclosure.

FIG. 5 is a diagram for describing an operation in which a user terminal determines a score based on a degree of similarity between motion information and a pre-stored motion command according to an embodiment of the disclosure.

Meanwhile, the pre-stored motion command may include a swipe motion command, a circle motion command, a pointy motion command, and a shake motion command.

Meanwhile, the user terminal 10 may determine a matching score of each of the plurality of motion commands based on the degree of similarity of the acquired motion information and each of the plurality of motion commands.

Referring to FIG. 5, a motion command C5 and motion information I5 of a user are disclosed.

The user terminal may determine the matching score based on the degree of similarity between motion information of the motion command C5 and the motion information I5 of the user. According to an embodiment, the user terminal 10 may compare a vertical length H5 of the motion information of the stylus pen with a vertical length of the motion command, and based on a horizontal length W5 of the motion information of the stylus pen, determine the degree of similarity between the motion information of the motion command C5 and the motion information I5 of the user, and score the determined degree of similarity.

The user terminal may, in response to the degree of similarity between the motion information and the corresponding motion command exceeding a predetermined score, determine that the corresponding motion information matches the motion command.

Meanwhile, in FIG. 5, the operation of determining the degree of similarity of the swipe operation has been described, but the degree of similarity of each of the motion commands with the motion of the user may also be determined by each method, and there is no limitation to the operation.

Figure 6A:
FIGS. 6A, 6B, and 6C are diagrams for describing feedback images according to various embodiments of the disclosure.
Figure 6B:
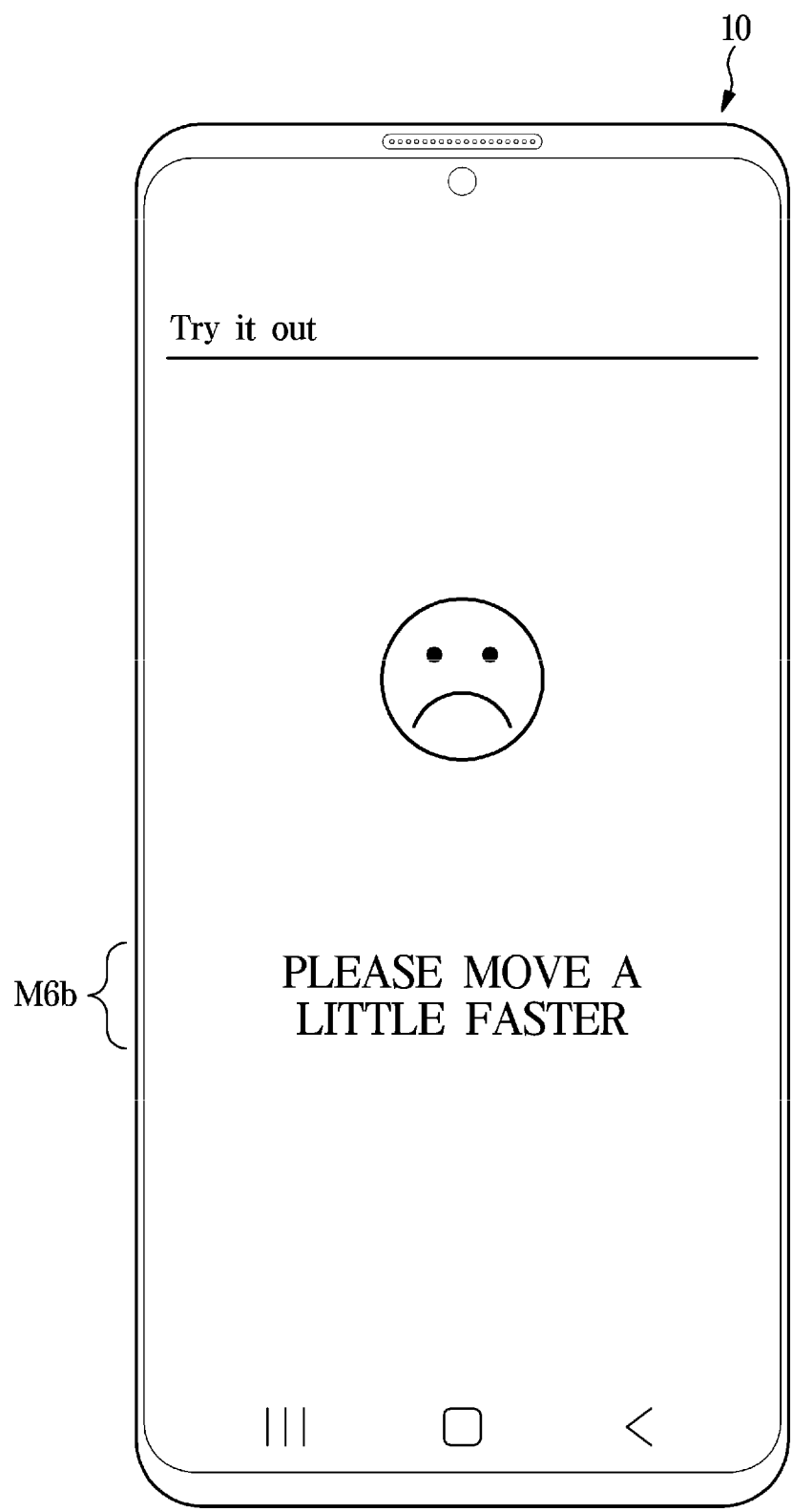
Figure 6C:
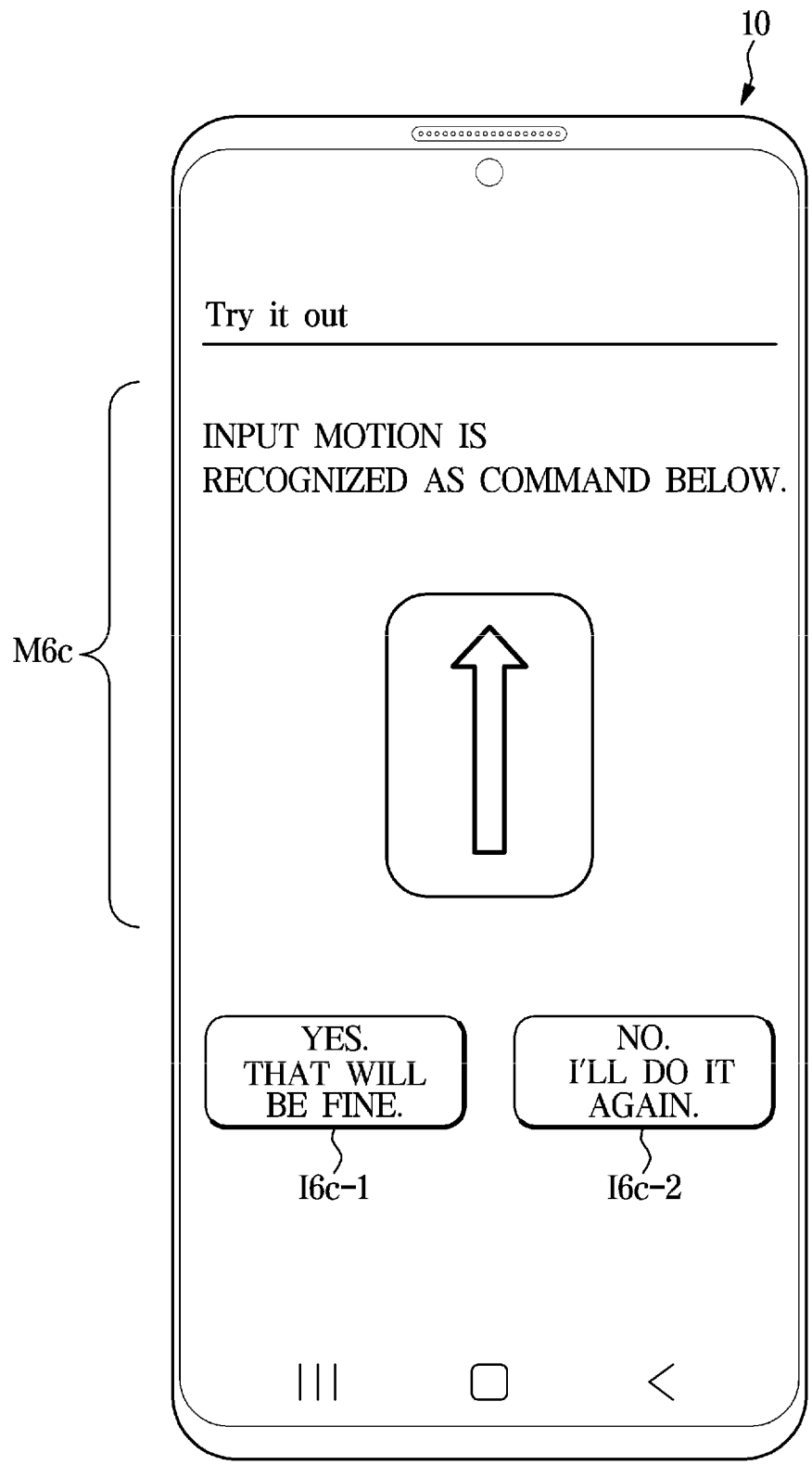

FIGS. 6A to 6C are diagrams for describing feedback images according to various embodiments of the disclosure.

Referring to FIG. 6A, an operation in which, when the motion information of the stylus pen inputted after the output of the tutorial image matches the corresponding to the motion command, the user terminal 10 outputs a feedback message is illustrated.

According to an embodiment, the user terminal may output a message M6a, such as "Good job!"

FIG. 6A corresponds to a case in which the user motion information smoothly matches with the motion command intended by the tutorial image.

Accordingly, for the corresponding motion command, the user terminal may determine the motion information of the stylus pen input by the user as the corresponding motion command.

Referring to FIG. 6B, FIG. 6B is a diagram illustrating an operation of outputting a feedback message in a case in which the motion information of the user received after the output of the tutorial image does not smoothly match with the motion command.

In this case, the user terminal may output a feedback message M6b requesting the user to take action once again.

According to an embodiment, in a case in which the user inputs the motion of the stylus pen slowly, a message, such as "Move a little faster!," may be output.

The user may, after the outputting of such a feedback message, input motion information of the stylus pen once again.

Meanwhile, when the user terminal 10 fails to match the motion information of the user with the motion command even after performing such an operation, a feedback message as shown in FIG. 6C may be output.

Referring to FIG. 6C, a feedback message output by the user terminal 10 when it is difficult to match the motion information input by the user after the outputting of the tutorial image with the motion command is illustrated.

The user terminal may output a feedback message M6c that, when the motion information recognized by the user terminal after the outputting of the tutorial image is difficult to match with the motion command, inquires to the user whether the user information input by the user corresponds to the corresponding motion command, and outputs selectable interfaces 16c-1 and 16c-2.

The user terminal 10 may output the motion command that is to match with the motion information input by the user together with the feedback message M6c.

In FIG. 6C, an upward swiping motion is presented in the tutorial image, and a feedback message M6c inquiring to the user whether an upward swipe motion has been input as a user motion is output.

Meanwhile, the user terminal may, in response to a command corresponding to the feedback message being input by the user, match the motion information input by the user with the output motion command.

Specifically, the user terminal may, in response to the user selecting selectable interface "Yes, I like it" 16c-1 on the interface as shown in FIG. 6C, match the motion information of the user with the motion command for swiping upward.

Meanwhile, the user terminal may, in response to the user selecting selectable interface "No. I will do it again" 16c-2 on the interface as shown in FIG. 5C, allow motion information corresponding to the tutorial image to be input once again.

Meanwhile, the operation described with reference to FIGS. 6A to 6C is only an example of an output form of the feedback message of the disclosure, and there is no limitation on the form of the feedback message output by the user terminal.

Figure 7:
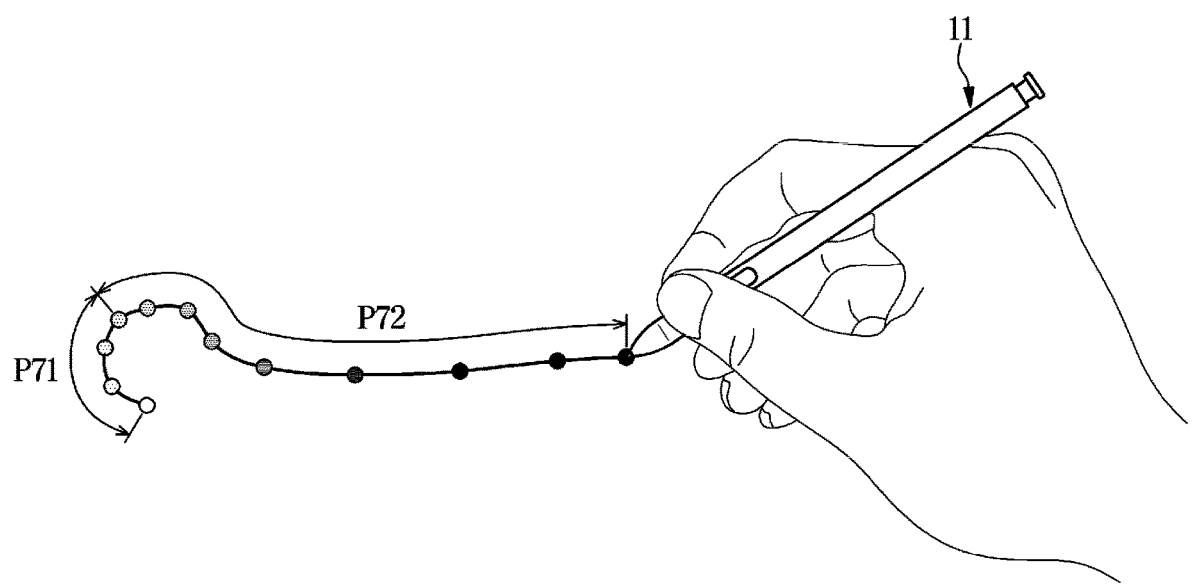
FIG. 7 is a diagram for describing an operation of comparing a motion part of motion information that exceeds a predetermined ratio with a motion command according to an embodiment of the disclosure.

FIG. 7 is a diagram for describing an operation of comparing a motion command with a motion of the motion information having a predetermined ratio according to an embodiment of the disclosure.

Referring to FIG. 7, a user terminal 10 may compare the similarities between each of the plurality of motion commands and a motion part of the motion information that exceeds a predetermined ratio and may match the motion information with at least one motion command.

Specifically, when the user inputs motion information using the stylus pen 11 as shown in FIG. 7, the user terminal may divide the corresponding motion into a part P71 and a part P72.

In FIG. 7, the user terminal 10 may determine that a motion having the longest lead distance in the user motion is a motion exceeding a predetermined ratio in the entire motion, and may determine the motion information based on the corresponding motion.

In the case of FIG. 7, when considering both the part P71 and the part P72, the user terminal 10 may recognize both a circular motion and a swipe motion by the motion of the user, but may determine that the swipe motion has a long lead distance and exceeds a predetermined ratio in the entire motion.

That is, the user terminal 10 may determine the motion shown in FIG. 7 as an action of swiping to the right, and thus may determine the corresponding motion information to match with the swipe motion command.

Meanwhile, in this case, the user terminal 10 may output a command image, and based on a command of the user in response to the command image, match the motion information with the motion command as will be described below.

Figure 8A:
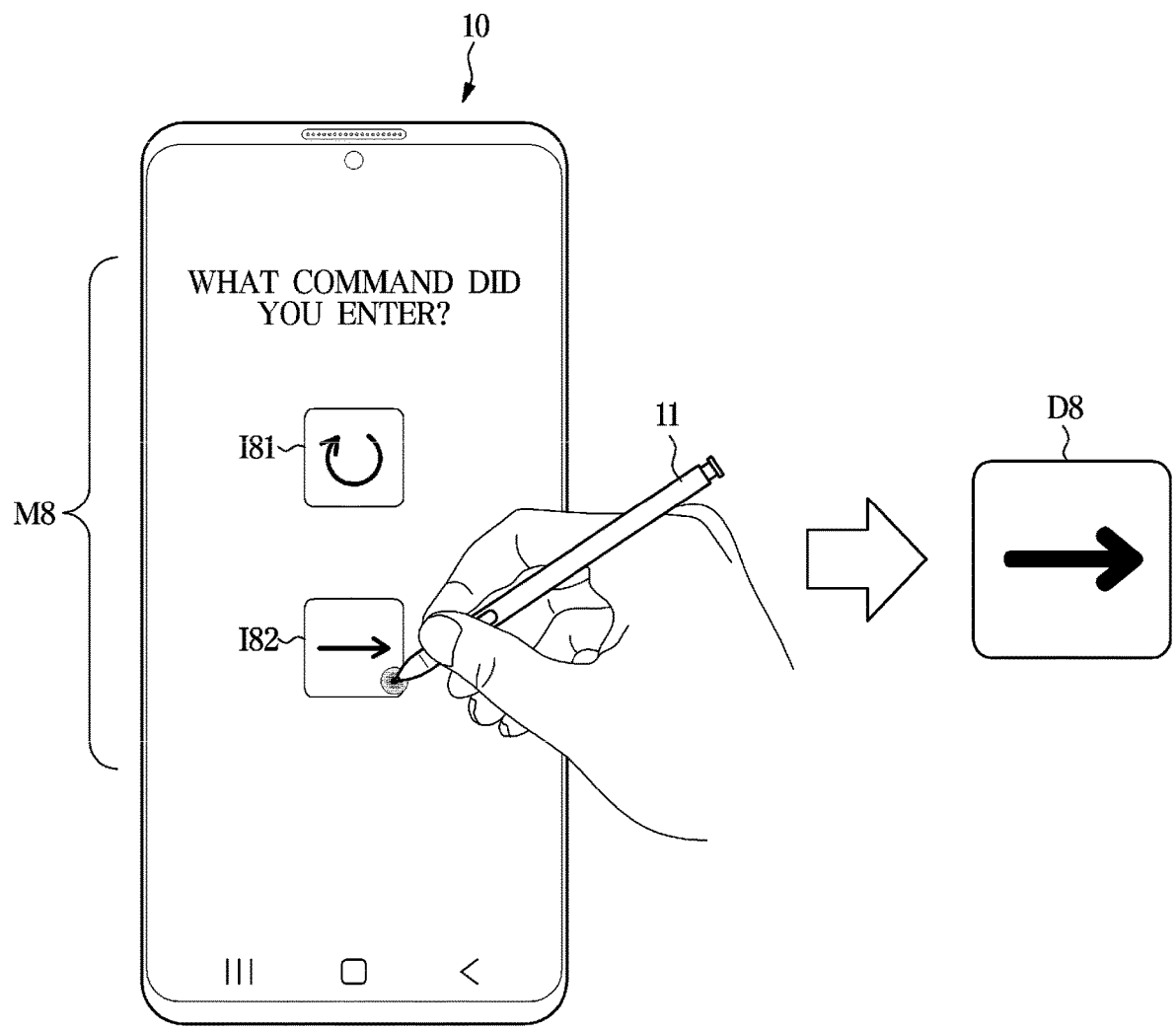

FIG. 8A is a diagram for describing an operation of matching motion information with a motion command based on user feedback, according to an embodiment of the disclosure.

As described above, the user terminal 10 may acquire motion information of the stylus pen and match the motion information with a plurality of motion commands.

Referring to FIG. 8A, it can be seen that the motion of the user matches with a circular motion command 181 and a swipe motion command 182, as in FIG. 7.

Referring to FIGS. 7 and 8A, the part P71 of the motion of the user may correspond to the circular motion command 181 and the part P72 may correspond to the swipe motion command 182.

In this case, the user terminal may output a message M8 for requesting feedback from the user and a plurality of command images (e.g., image of circular motion command 181 and image of swipe motion command 182) corresponding to the plurality of motion commands, respectively, on the display as shown in FIG. 8A.

The user may input a feedback command for selecting one of the plurality of output command images.

FIG. 8A shows a case of the user selecting the swipe motion command 182.

Referring to FIG. 8A, the user terminal 10 may determine the corresponding user motion as a right swipe motion command D8.

That is, the user terminal 10 may, based on a user feedback command for selecting one of the plurality of command images, determine the motion information of the user as a motion command corresponding to the selected command image.

Meanwhile, the operation described with reference to FIG. 8A is merely an embodiment for describing a user's feedback command for selecting a plurality of command images, and there is no limitation in the form of the image output by the user terminal or the type of the feedback command.

FIG. 8B is a diagram illustrating a trajectory of a user on a user terminal according to an embodiment of the disclosure.

Referring to FIG. 8B, the user terminal may output a trajectory ML8 of the stylus pen to the user terminal through communication with the stylus pen.

The user terminal may output the trajectory of the stylus pen to inform the user of the type of motion information input by the user.

Based on the operation, the user may check whether the user has input correct motion information.

The user may check the motion information itself and input motion information that may match with the command image.

FIGS. 9A to 9D are diagrams for describing an operation of matching motion information with a plurality of predetermined motion commands, according to various embodiments of the disclosure.

Figure 9A:
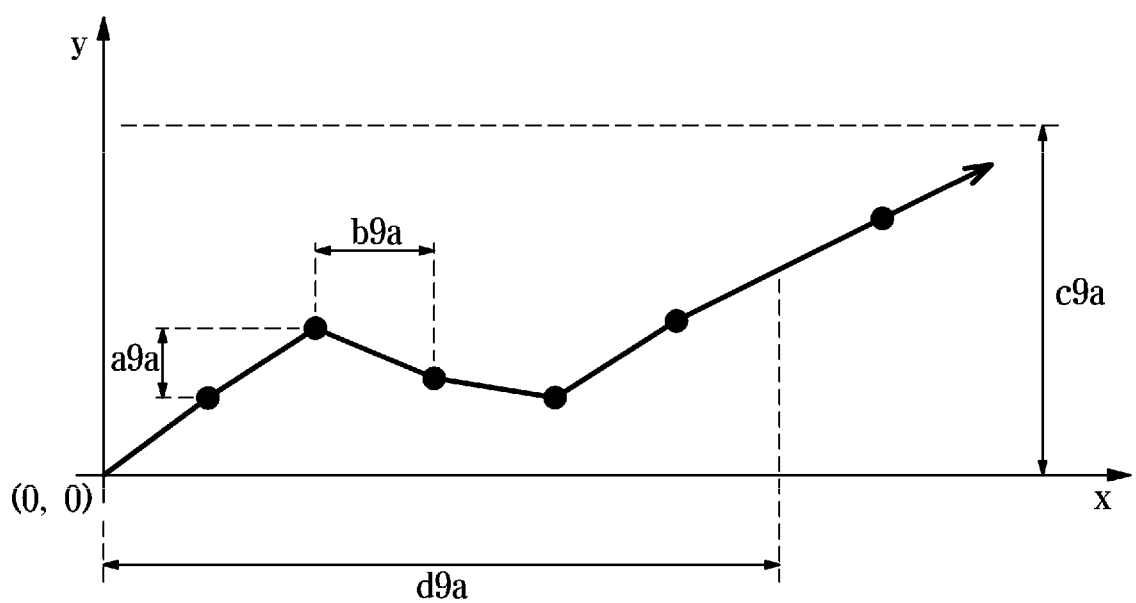
FIGS. 9A, 9B, 9C, and 9D are diagrams for describing an operation of matching motion information with a plurality of predetermined motion commands according to various embodiments of the disclosure.

FIG. 9A is a diagram for describing an operation of determining motion information for a motion command corresponding to a swipe according to an embodiment of the disclosure.

Referring to FIG. 9A, a range a9a may denote an allowable range for a single motion in a direction perpendicular to a progress direction. A distance b9a may denote a minimum moving distance in the progress direction. A range c9a may denote a maximum allowable range from a starting point in the perpendicular direction.

A distance d9a may denote a minimum distance for determining a motion command.

The user terminal may, when the motion information of the user includes a case of moving less than the range a9a in a single action, a case of moving larger than the distance b9a in the progress direction, a case of moving from the starting point in the perpendicular direction by a separation distance that is smaller than the range c9a, and the like, determine the corresponding user motion as the motion command corresponding a swipe motion.

Figure 9B:
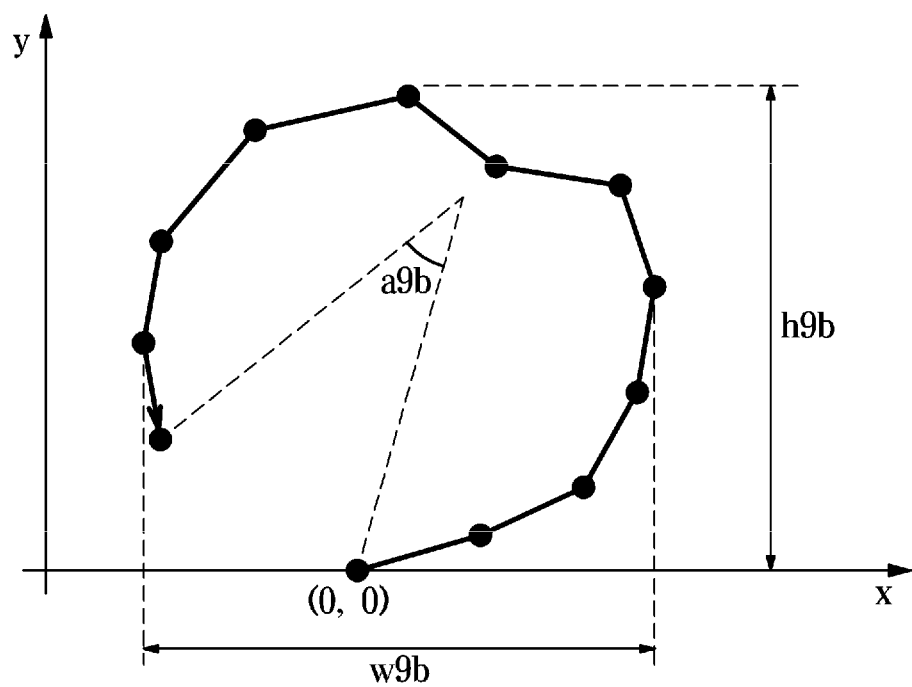

FIG. 9B is a diagram for describing an operation of determining motion information for a motion command corresponding to a circle according to an embodiment of the disclosure.

Referring to FIG. 9B, an angle a9b may denote an angle formed by a start point and an end point at a center point of a path. A height w9b may denote the height of the motion information. A height h9b may denote the height of the gesture.

The user terminal 10 may, in a case of three points on the motion information not coinciding with a straight line or in a case of rotation in the user's motion direction, determine that the motion of the user corresponds to a motion command corresponding to a circle.

In addition, even based on the aspect ratio (the ratio of the height w9b and the height h9b) of the corresponding motion information, it may be determined whether the corresponding motion information corresponds to a motion command of a circle.

Figure 9C:
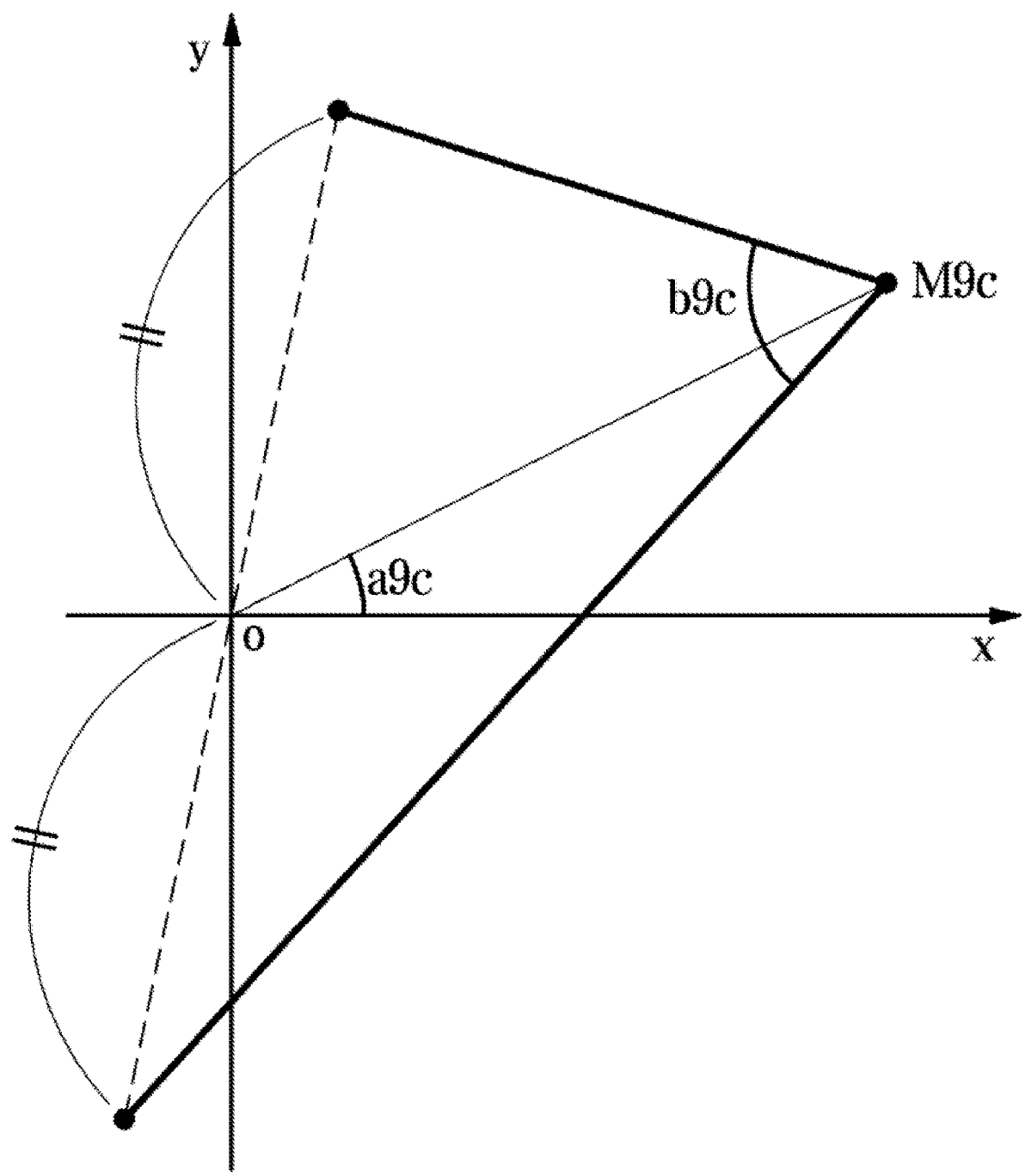

FIG. 9C is a diagram for describing an operation of determining motion information for a motion command corresponding to an angle bracket (Pointy) according to an embodiment of the disclosure.

Referring to FIG. 9C, reference character M9c may denote an inflection point of a pointy gesture.

An angle a9c may denote an angle formed by a line segment formed by an origin and an inflection point. An angle b9c may denote an included angle of the inflection point. Meanwhile, in the case of an angle bracket, the user terminal may determine the pointy gesture based on the x-axis, the y-axis, and the position of the inflection point of the motion information.

In addition, the user terminal may, when the angle b9c is greater than 0 and less than 130 while moving in the motion direction, determine the corresponding user motion as a pointy gesture.

In addition, the user terminal may determine whether the corresponding motion information corresponds to the pointy motion command based on the angle a9c or the angle obtained by subtracting the angle a9c from 90 degrees.

Figure 9D:
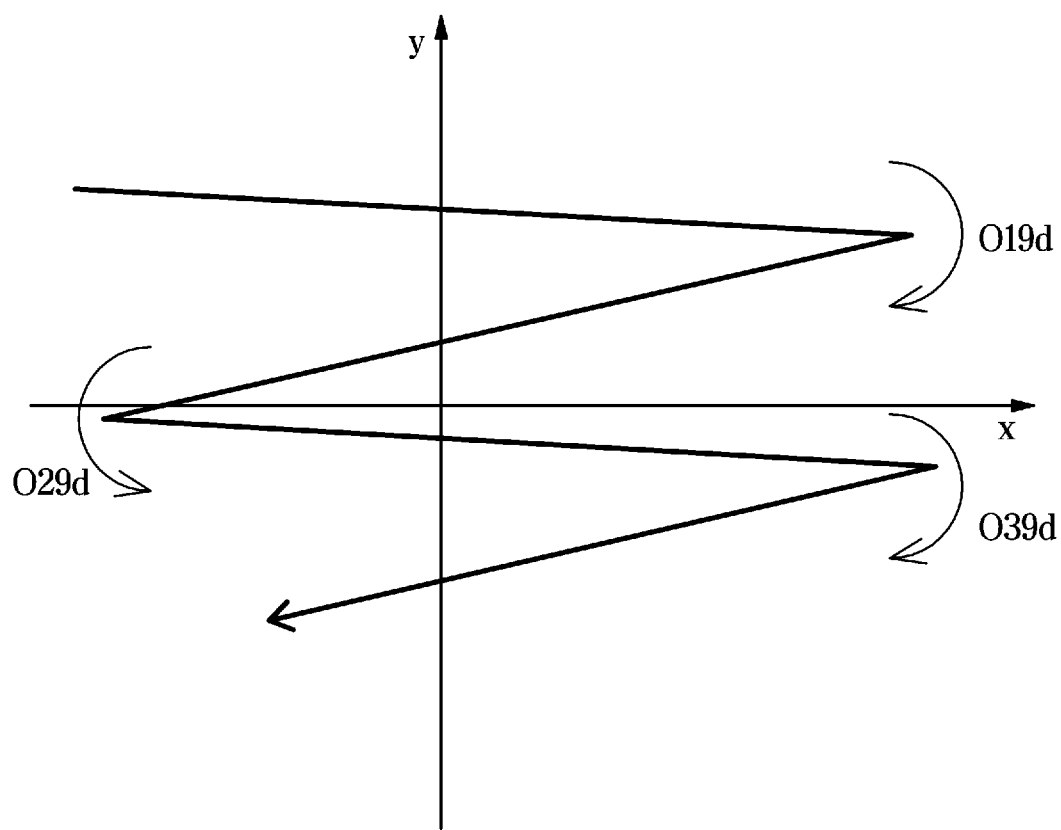

FIG. 9D is a diagram for describing an operation of determining motion information for a motion command corresponding to a shake according to an embodiment of the disclosure.

Specifically, FIG. 9D shows a plurality of inflection points O19d, O29d, and O39d of the motion of the user.

The user terminal 10 may detect a motion in a direction reverse to the progress direction in the motion information, and when the included angle of the motion is less than or equal to a specific angle, determine that the corresponding motion information corresponds to a motion command corresponding to a shake.

In addition, the user terminal 10 may, when the corresponding inflection point is detected more than a predetermined number of times in a single piece of motion information, determine that the corresponding motion information corresponds to the shaking motion command.

Meanwhile, the operation described in FIGS. 9A to 9D is only an embodiment in which the user terminal determines motion information to match with a predetermined motion command, and there is no limitation in the method of the user terminal determining the acquired motion information.

Figure 10:
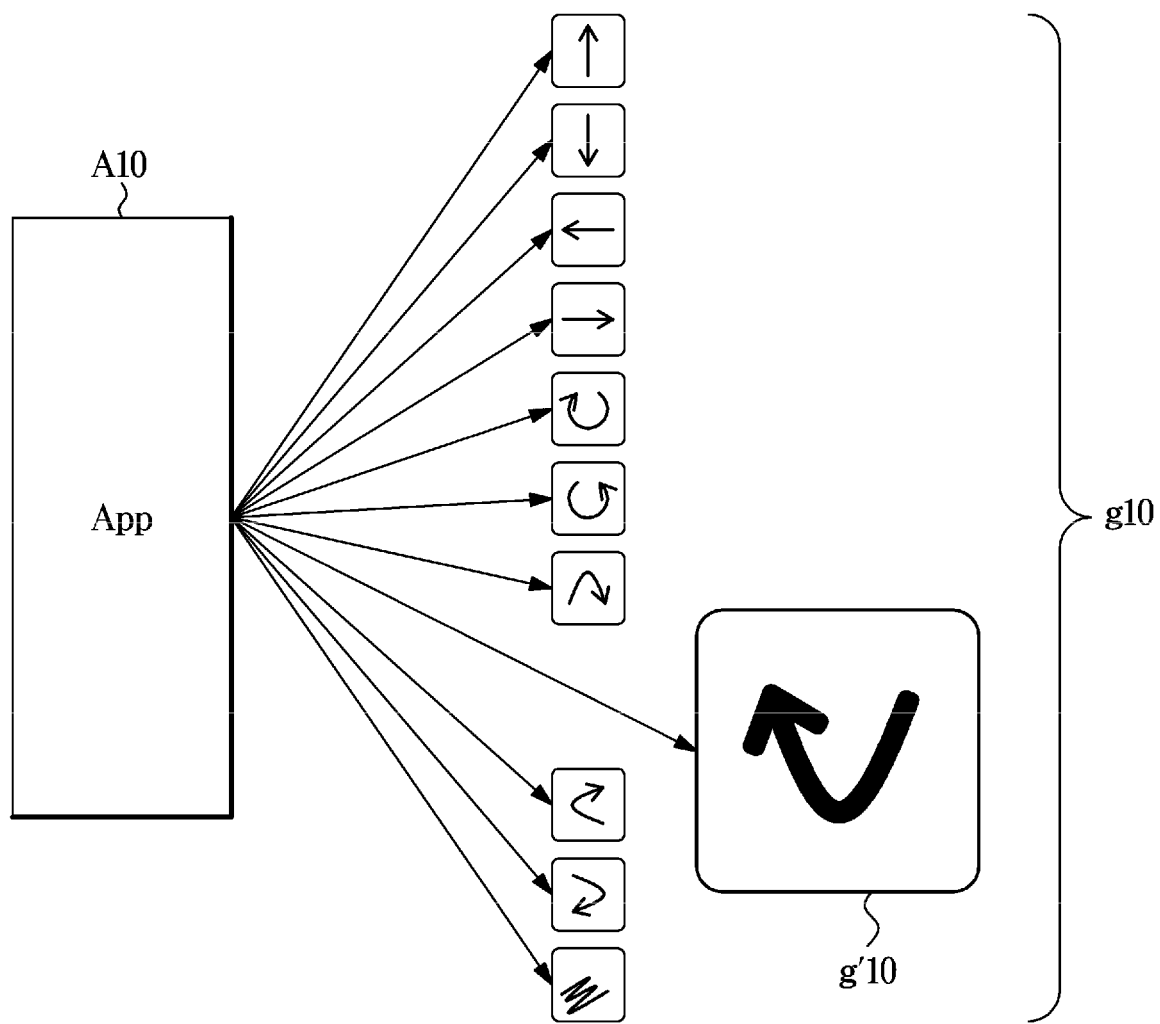
FIG. 10 is a diagram for describing an operation of assigning a weight to a motion command corresponding to an application execution according to an embodiment of the disclosure.

FIG. 10 is a diagram for describing an operation of assigning a weight to a motion command corresponding to an application execution according to an embodiment of the disclosure.

Referring to FIG. 10, the user terminal 10 may assign a weight to each of a plurality of motion commands g10 based on an application A10 executed in the user terminal.

In addition, the user terminal may match the motion information with at least one of the plurality of motion commands based on the motion information and the weight.

In the case of FIG. 10, the user terminal may, upon execution of a specific application (e.g., the application A10) in which a pointy gesture is frequently used, assign a weight to a corresponding motion command g'10 among the plurality of motion commands g10.

Here, the specific application may refer to a camera, an Internet application, or the like.

That is, the user terminal may control to assign a higher weight to the pointy motion command (e.g., the corresponding motion command g'10) in matching the user motion with the gesture command during execution of the specific application such that the user motion is recognized as a pointy gesture.

For example, when the motion of the user is recognized as a swipe motion command and a pointy motion command at a similar level, the user terminal may recognize the corresponding motion information as a pointy command.

Meanwhile, the operation of the disclosure described with reference to FIG. 10 is only an embodiment of the disclosure, and there is no limitation on the type of application to be executed and the motion command to which a weight is assigned.

FIGS. 11A to 11D are diagrams for describing an operation of assigning a weight to motion information according to various embodiments of the disclosure.

The user terminal may assign a weight to a part of acquired motion information based on the matching data.

In addition, the user terminal may recognize the weighted motion information as one of the motion commands.

Hereinafter, various embodiments in which weights are differently applied to each motion command will be described.

Figure 11A:
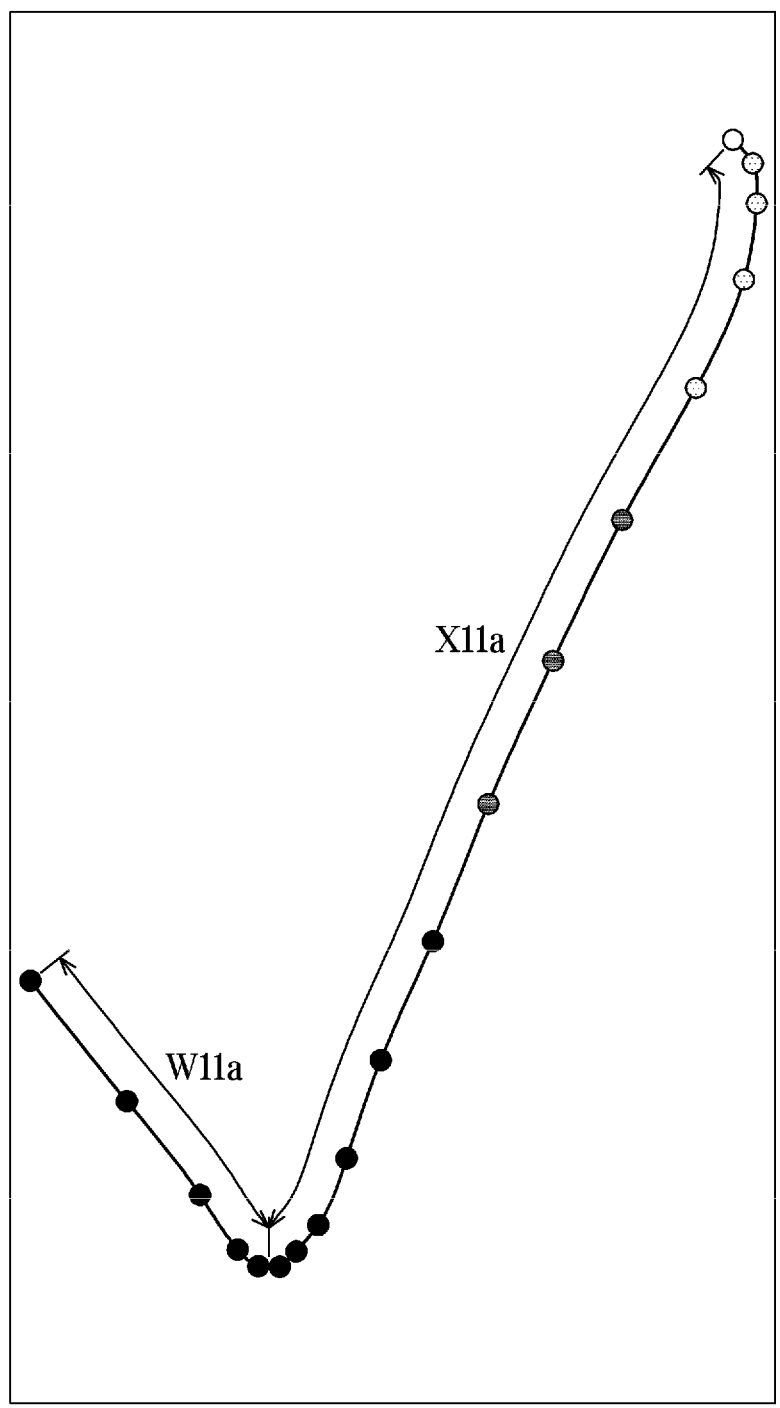
FIGS. 11A, 11B, 11C, and 11D are diagrams for describing an operation of assigning a weight to motion information according to various embodiments of the disclosure.

FIG. 11A is a diagram for describing an operation in which a weight is applied to a user motion when the user motion matches with a pointy motion command according to an embodiment of the disclosure.

Referring to FIG. 11A, the user terminal may differently determine weights for recognizing a motion part W11a and a motion part X11a at a time of recognition of a pointy motion command according to matching data.

The user terminal may generally recognize the motions parts W11a and X11a in a proportion of 1:3.

However, the user terminal may, in a case of having matching data in which user feedback is reflected, recognize the motions parts W11a and X11a in a proportion of 1:5, so that the recognition of the motion information of the user may be improved.

Figure 11B:
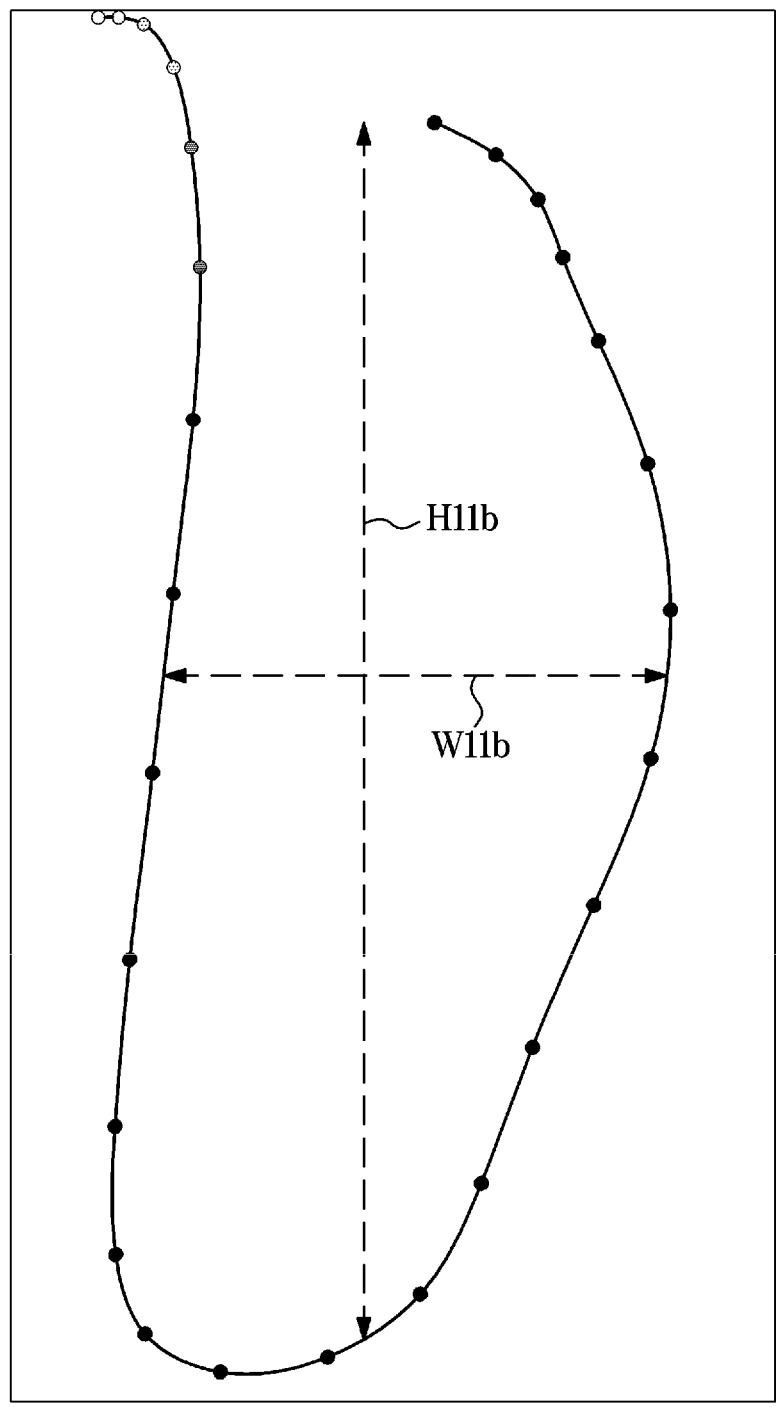

FIG. 11B is a diagram for describing an operation in which a weight is applied to a user motion when the user motion matches with an elliptical motion command according to an embodiment of the disclosure.

Referring to FIG. 11B, the user terminal may differently determine weights for recognizing a motion part W11b and a motion part H11b at a time of recognition of an elliptical motion command according to matching data.

The user terminal may generally recognize the motion parts W11b and H11b in a proportion of 4:10. However, the user terminal may, in a case of having matching data in which user feedback is reflected, recognize the motion parts W11b and H11b in a proportion of 4:5; 10, so that the recognition of the motion information of the user may be improved.

Figure 11C:
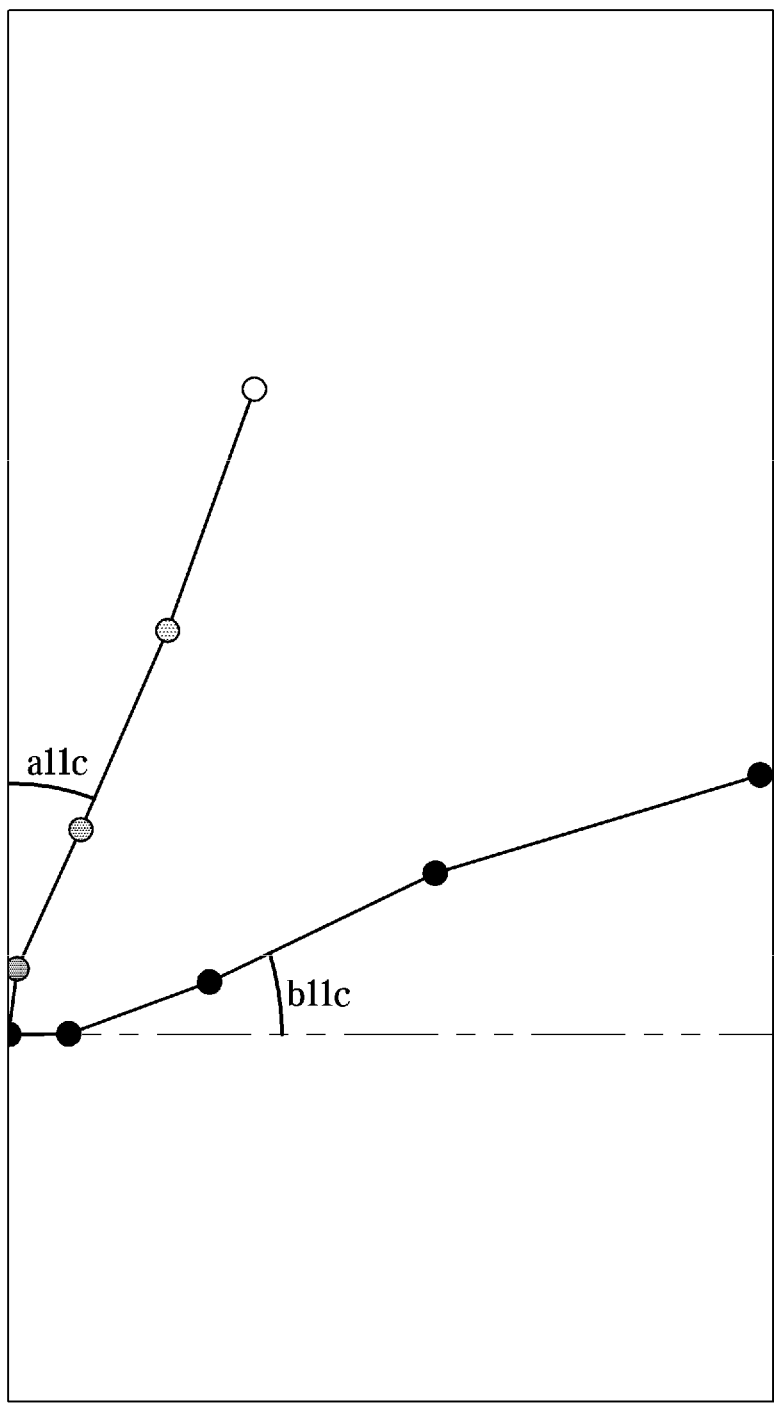

FIG. 11C is a diagram for describing an operation in which a weight is applied to a user motion when the user motion matches with another pointy motion command according to an embodiment of the disclosure.

Referring to FIG. 11C, when recognizing a pointy motion command, angles formed by the motion information with the X-axis and the Y-axis may be considered according to the above-described matching data.

Specifically, the user terminal may acquire angles b11c and a11c formed with each of the x-axis and the y-axis, respectively, and when the angle formed with the y-axis is smaller than the angle formed with the x-axis and when the difference between the two angles is greater than or equal to a specific value, assign a higher weight to the pointy motion command.

Figure 11D:
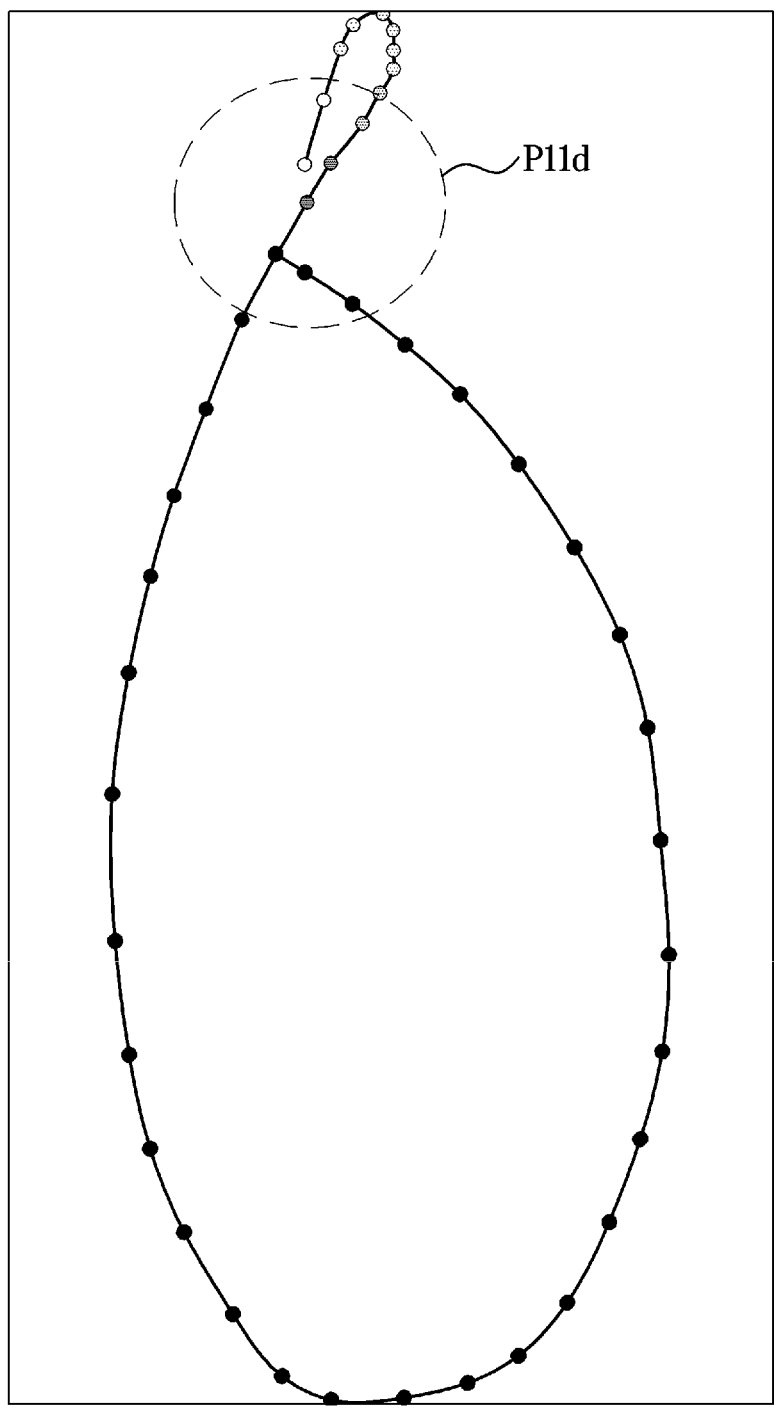

FIG. 11D is a diagram for describing an operation in which a weight is applied to a user motion when the user motion matches with another circular motion command according to an embodiment of the disclosure.

Referring to FIG. 11D, when the above-described weight is applied and the probability of identifying the pointy motion command increases, it may be difficult for the user terminal to identify the corresponding motion information as a circular motion command, even when the motion information is a completely closed circular motion.

Accordingly, the user terminal may form mapping data by assigning a weight P11d when the circular motion is identified as being closed such that closed circular motion information is recognized as a circular motion command even when the pointy motion command is weighted.

Meanwhile, FIGS. 11A to 11D are only an embodiment in which weights are given to motion information and motion commands in the disclosure, and there is no limitation on the operation of assigning weights to motion information and motion commands.

Figure 12:
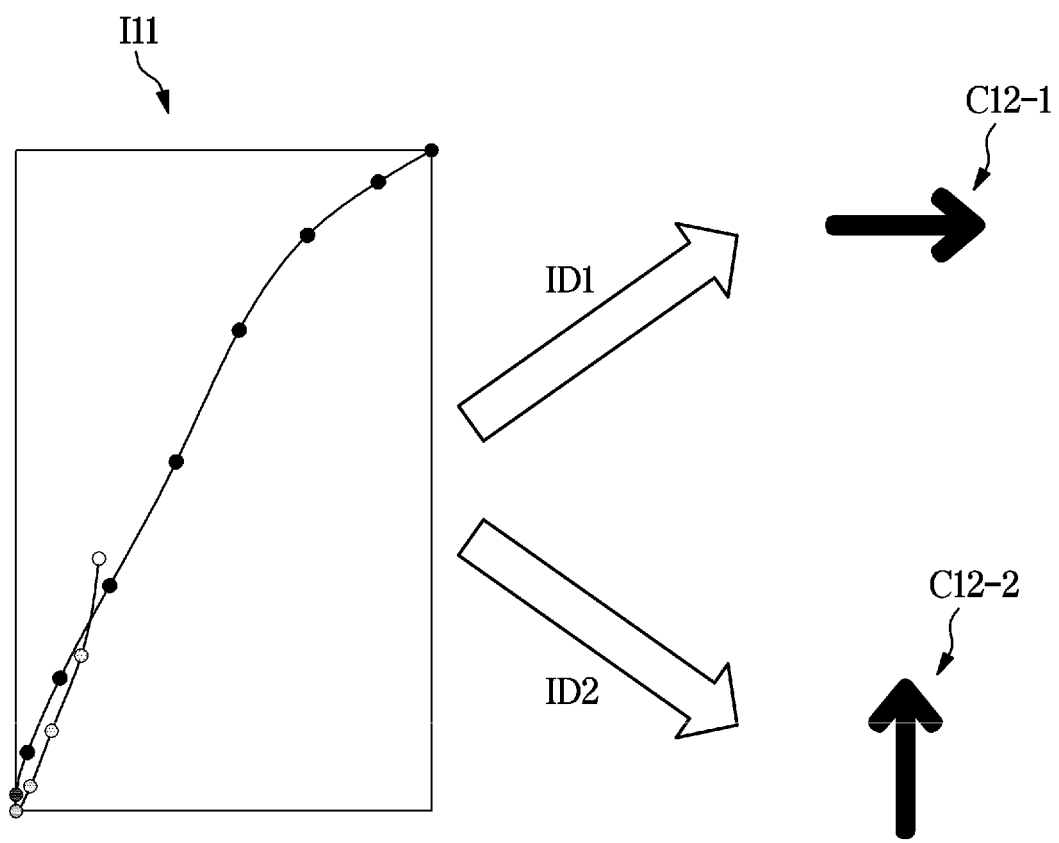
FIG. 12 is a diagram for describing an operation of executing a motion command through matching data with motion information according to an embodiment of the disclosure.

FIG. 12 is a diagram for describing an operation of executing a motion command using matching data with motion information according to an embodiment of the disclosure.

The user terminal may form matching data in which each of the plurality of motion commands matches with motion information for each user account registered on the user terminal.

Specifically, the user terminal may, upon motion information I11 of the user being acquired, receive feedback from the user and match the motion information with a motion command, to thereby form matching data based on the motion command matched with the motion information I11.

Meanwhile, the matching data is data for improving the recognition rate of motion for each user, and the user terminal may form the matching data for each user account.

Referring to FIG. 12, the user terminal may, even with the same motion information being acquired, recognize the motion information I11 as a motion command C12-1 of motion information of swiping sideways in a case of using matching data corresponding to a first user account ID1.

Meanwhile, even with the same motion information, the user terminal may recognize the motion information as a motion command C12-2 of motion information of swiping upward in a case using matching data corresponding to a second user account ID2.

That is, the user terminal may form the matching data based on the feedback of the user and recognize the motion data as a motion command using the matching data for each user account to thereby improve the recognition rate of the motion information of the user.

Meanwhile, the operation of the disclosure described with reference to FIG. 12 is only an embodiment of the disclosure, and there is no limitation in the operation of the user terminal recognizing motion data using matching data.

Figure 13:
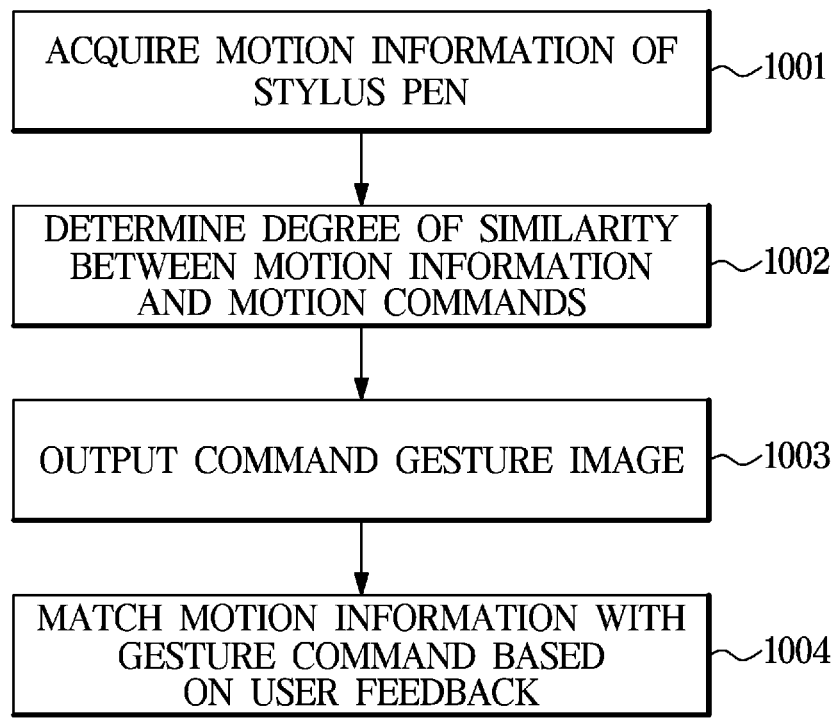
FIGS. 13 and 14 are diagrams illustrating flowcharts according to various embodiments of the disclosure.
Figure 14:
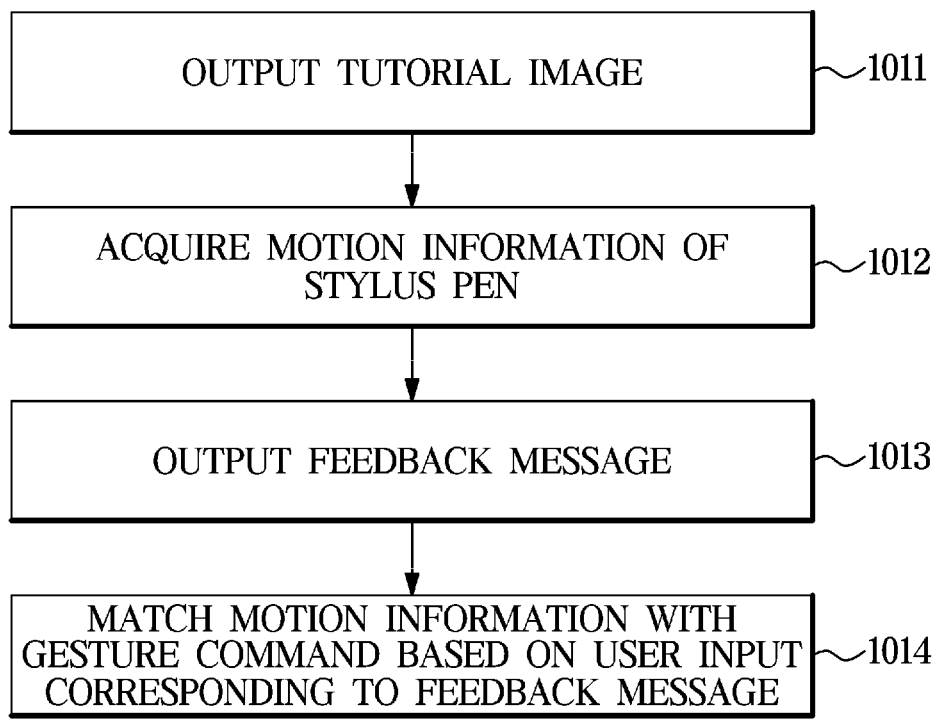

FIGS. 13 and 14 are diagrams illustrating flowcharts according to various embodiments of the disclosure.

Referring to FIG. 13, the user terminal may acquire motion information of the input device, in operation 1001.

In addition, the user terminal may determine the degree of similarity between the motion information and a plurality of motion commands, and may determine a score of each motion command based on the degree of similarity, in operation 1002.

Meanwhile, the user terminal may output a selection image of a motion command associated with the corresponding motion information, in operation 1003.

Thereafter, the user may input a feedback for selecting the corresponding motion command to the user terminal, and the user terminal may match the motion information with the motion command based on the feedback, in operation 1004.

Meanwhile, FIG. 14 is a diagram for describing an operation of matching motion information with a motion command using a tutorial image.

Referring to FIG. 14, the user terminal may output a tutorial image, in operation 1011.

The user terminal may, after the output of the tutorial image, acquire motion information of the stylus pen, in operation 1012.

Thereafter, the user terminal may output a feedback message for the corresponding motion, in operation 1013. Since the type and content of the feedback message have been described above, detailed descriptions thereof will be omitted.

Meanwhile, the user terminal may match the motion information with the motion command based on a user input corresponding to the feedback message, in operation 1014.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a read-only memory (ROM), a random access memory (RAM), a magnetic tape, a magnetic disk, a flash memory, an optical data storage device, and the like.

While the disclosure has been shown and described with reference to various embodiments thereof, it will be understood by those skilled in the art that various changes is form and details may be made therein without departing from the spirit and scope of the disclosure as defined by the appended claims and their equivalents.

What is claimed is:

1. An electronic device comprising:
    a display;
    a communicator wirelessly connected to a stylus pen;
    memory storing one or more computer programs; and
    one or more processors communicatively coupled to the display, the communicator, and the memory,
    wherein the one or more computer programs include computer-executable instructions which, when executed by the one or more processors, cause the electronic device to:
    execute an application,
    based on the application being executed, assign a first weight to a first motion command more frequently used among a plurality of motion commands corresponding to the application and assign a second weight to second motion commands among the plurality of motion commands and different from the first motion command, the first weight being higher than the second weight,
    form matching data in which each of the plurality of motion commands corresponds to motion information for each user account registered on the electronic device, the matching data being formed based on user feedback of each user account,
    acquire motion information of the stylus pen,
    based on the acquiring of the motion information of the stylus pen, the first weight, the second weight, and the matching data, output, to the display, a plurality of command images corresponding to the plurality of motion commands, respectively, together with a trajectory image corresponding to a trajectory of the stylus pen, the trajectory image being adjacent to a message comprising the plurality of command images, the plurality of motion commands being output based on the plurality of motion commands matching the motion information of the stylus pen, and
    based on a user feedback command selecting one of the plurality of command images, determine the motion information as a command image motion command corresponding to the selected command image.

2. The electronic device of claim 1, wherein the one or more computer programs further include computer-executable instructions which, when executed by the one or more processors, cause the electronic device to:
output, to the display, a tutorial image,
acquire motion information of the stylus pen corresponding to the tutorial image, and
determine the motion information of the stylus pen as a tutorial image motion command corresponding to the tutorial image.

3. The electronic device of claim 2, wherein the one or more computer programs further include computer-executable instructions which, when executed by the one or more processors, cause the electronic device to:
after acquiring the motion information of the stylus pen corresponding to the tutorial image, output, to the display, a feedback message, and
based on a user input corresponding to the feedback message, determine the motion information of the stylus pen as the tutorial image motion command corresponding to the tutorial image.

4. The electronic device of claim 1, wherein the one or more computer programs further include computer-executable instructions which, when executed by the one or more processors, cause the electronic device to:
based on a degree of similarity between the motion information and each of the plurality of motion commands, determine a matching score of each of the plurality of motion commands, and
output, to the display, one or more command images corresponding to the plurality of motion commands in which the matching score exceeds a predetermined value.

5. The electronic device of claim 1, wherein the one or more computer programs further include computer-executable instructions which, when executed by the one or more processors, cause the electronic device to:
compare a degree of similarity between a motion part of the motion information exceeding a predetermined ratio and each of the plurality of motion commands, and
match the motion information with at least one of the plurality of motion commands.

6. The electronic device of claim 5, wherein the one or more computer programs further include computer-executable instructions which, when executed by the one or more processors, cause the electronic device to:
perform supervised learning using the plurality of motion commands as reference data, and
using the motion information as input data, match the motion information with the plurality of motion commands.

7. The electronic device of claim 5, wherein the one or more computer programs further include computer-executable instructions which, when executed by the one or more processors, cause the electronic device to:
based on the motion information, the first weight, and the second weight, match the motion information with at least one of the plurality of motion commands.

8. The electronic device of claim 1, wherein the one or more computer programs further include computer-executable instructions which, when executed by the one or more processors, cause the electronic device to:
based on the matching data and the motion information, execute one of the plurality of motion commands.

9. The electronic device of claim 8, wherein the one or more computer programs further include computer-executable instructions which, when executed by the one or more processors, cause the electronic device to:
based on the matching data, assign a third weight to a part of the motion information, and
recognize the motion information assigned the third weight as one of the plurality of motion commands.

10. A method performed by an electronic device, the method comprising:
executing, by the electronic device, an application;
based on the application being executed, assigning, by the electronic device, a first weight to a first motion command more frequently used among a plurality of motion commands corresponding to the application and assigning, by the electronic device, a second weight to second motion commands among the plurality of motion commands and different from the first motion command, the first weight being higher than the second weight;
forming matching data in which each of the plurality of motion commands corresponds to motion information for each user account registered on the electronic device, the matching data being formed based on user feedback of each user account;
acquiring, by the electronic device, motion information of a stylus pen;
based on the acquiring of the motion information of the stylus pen, the first weight, the second weight, and the matching data, outputting, by the electronic device to a display, a plurality of command images corresponding to the plurality of motion commands, respectively, together with a trajectory image corresponding to a trajectory of the stylus pen, the trajectory image being adjacent to a message comprising the plurality of command images, the plurality of motion commands being output based on the plurality of motion commands matching the motion information of the stylus pen; and
based on a user feedback command selecting one of the plurality of command images, determining, by the electronic device, the motion information as a command image motion command corresponding to the selected command image.

11. The method of claim 10, further comprising:
outputting, by the electronic device to the display, a tutorial image;
acquiring, by the electronic device, motion information of the stylus pen corresponding to the tutorial image; and
determining, by the electronic device, the motion information of the stylus pen as a tutorial image motion command corresponding to the tutorial image.

12. The method of claim 11, further comprising:
after acquiring the motion information of the stylus pen corresponding to the tutorial image, outputting, by the electronic device to the display, a feedback message; and
based on a user input corresponding to the feedback message, determining, by the electronic device, the motion information of the stylus pen as the tutorial image motion command corresponding to the tutorial image.

13. The method of claim 10, further comprising:
based on a degree of similarity between the motion information and each of the plurality of motion commands, determining, by the electronic device, a matching score of each of the plurality of motion commands; and
outputting, by the electronic device to the display, one or more command images corresponding to the plurality of motion commands in which the matching score exceeds a predetermined value.

14. The method of claim 10, further comprising:

comparing, by the electronic device, a degree of similarity between a motion part of the motion information exceeding a predetermined ratio and each of the plurality of motion commands; and matching, by the electronic device, the motion information with at least one of the plurality of motion commands.

15. The method of claim 14, further comprising:

performing, by the electronic device, supervised learning using the plurality of motion commands as reference data; and using the motion information as input data, matching, by the electronic device, the motion information with the plurality of motion commands.

16. The method of claim 10, wherein the motion information comprises user behavior pattern information and usage characteristic information of a user that are recognized after a tutorial image is output.

17. The method of claim 10, wherein the trajectory of the stylus pen is output to inform a user of a type of the motion information input by the user.

18. The method of claim 11, wherein the tutorial image comprises a guide image output by the electronic device to guide a specific motion of a user.

19. The method of claim 18, further comprising:

outputting, by the electronic device, the guide image for guiding the specific motion together with a description of the specific motion.

20. The electronic device of claim 1, wherein the motion information of the stylus pen is acquired based on a movement of the stylus pen while being separated from the display, wherein the one or more computer programs further include computer-executable instructions which, when executed by the one or more processors, cause the electronic device to:

based on the acquiring of the motion information of the stylus pen, divide a motion corresponding to the motion information into at least two parts in which the at least two parts have different characteristics, and wherein a first part of the at least two parts corresponds to a first one motion command among the plurality of motion commands and a second part of the at least two parts corresponds to a second one motion command among the plurality of motion commands.

21. The electronic device of claim 1, wherein the one or more computer programs further include computer-executable instructions which, when executed by the one or more processors, cause the electronic device to:

in response to the motion information being identified as matching at least two motion commands including the first motion command, identify the first motion command as corresponding to the motion information.

* * * * *